US012347203B2

United States Patent
Miyata et al.

(10) Patent No.: US 12,347,203 B2
(45) Date of Patent: Jul. 1, 2025

(54) MOVING OBJECT DETECTION SYSTEM AND INFORMATION MANAGEMENT APPARATUS

(71) Applicant: Panasonic Intellectual Property Management Co., Ltd., Osaka (JP)

(72) Inventors: Atsushi Miyata, Osaka (JP); Daijiroh Ichimura, Hyogo (JP); Hidehiko Shin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 477 days.

(21) Appl. No.: 17/945,388

(22) Filed: Sep. 15, 2022

(65) Prior Publication Data
US 2023/0015683 A1 Jan. 19, 2023

Related U.S. Application Data

(63) Continuation of application No. PCT/JP2020/044081, filed on Nov. 26, 2020.

(30) Foreign Application Priority Data

Apr. 13, 2020 (JP) .................. 2020-071807

(51) Int. Cl.
*G06V 20/52* (2022.01)
*G06T 7/11* (2017.01)
(Continued)

(52) U.S. Cl.
CPC .............. *G06V 20/53* (2022.01); *G06T 7/11* (2017.01); *G06T 7/20* (2013.01); *G06T 7/70* (2017.01);
(Continued)

(58) Field of Classification Search
CPC ...... G06V 20/53; G06V 2201/07; G06T 7/11; G06T 7/20; G06T 7/70; G06T 2207/30241; G06T 2207/30242; G06T 7/60
See application file for complete search history.

(56) References Cited

U.S. PATENT DOCUMENTS 10,853,949 B2 * 12/2020 Komiya ................. H04N 7/188
2013/0290336 A1 10/2013 Moriguchi et al.
(Continued)

FOREIGN PATENT DOCUMENTS

JP 11-15981 1/1999
JP 2007-87208 4/2007
(Continued)

OTHER PUBLICATIONS

Zou, Fangyuan, Jing Li, and Weidong Min. "Distributed face recognition based on load balancing and dynamic prediction." Applied Sciences 9.4 (2019): 794. (Year: 2010).*
(Continued)

*Primary Examiner* — Andrae S Allison
(74) *Attorney, Agent, or Firm* — Wenderoth, Lind & Ponack, L.L.P.

(57) ABSTRACT

A moving object detection system detecting moving objects based on a captured image comprising: cameras capturing images to generate image data; image recognition circuitries each performing image recognition on the image data generated by each camera to detect a moving object in a captured image indicated by the image data; and an information management apparatus managing image data supplied from each camera to a corresponding image recognition circuitry. The information management apparatus includes a communication interface performing data communication with the cameras and the image recognition circuitries, and a controller managing congestion informa-
(Continued)

tion on the number of moving objects localized within a range of a captured image indicated by image data for each camera, and controlling the communication interface to supply the image data generated by the cameras to each image recognition circuitry, distributing the image data according to the congestion information.

10 Claims, 17 Drawing Sheets

(51) Int. Cl.
  *G06T 7/20* (2017.01)
  *G06T 7/70* (2017.01)
(52) U.S. Cl.
  CPC .............. *G06T 2207/30241* (2013.01); *G06T 2207/30242* (2013.01); *G06V 2201/07* (2022.01)

(56) References Cited

U.S. PATENT DOCUMENTS

| | | | |
|---|---|---|---|
| 2015/0146006 A1 | 5/2015 | Kawano | |
| 2016/0253883 A1* | 9/2016 | Westmacott | H04N 7/181 348/159 |
| 2017/0256044 A1* | 9/2017 | Maruyama | G06F 18/22 |
| 2018/0286068 A1* | 10/2018 | Matsubara | G06T 7/60 |
| 2019/0146991 A1* | 5/2019 | Sato | G06V 40/103 382/224 |
| 2019/0180447 A1 | 6/2019 | Komiya et al. | |
| 2022/0180529 A1* | 6/2022 | Muta | G06V 20/53 |
| 2022/0254162 A1* | 8/2022 | Felemban | G06V 20/49 |
| 2022/0360744 A1* | 11/2022 | Fee | H04N 7/122 |
| 2023/0015683 A1* | 1/2023 | Miyata | G06T 7/70 |
| 2023/0412925 A1* | 12/2023 | Ida | H04N 23/90 |

FOREIGN PATENT DOCUMENTS

| | | |
|---|---|---|
| JP | 2010-124382 | 6/2010 |
| JP | 2014-59703 | 4/2014 |
| JP | 2015-103104 | 6/2015 |
| JP | 2018-137560 | 8/2018 |
| JP | 2019-47164 | 3/2019 |
| JP | 6532234 | 6/2019 |
| JP | 2019-200715 | 11/2019 |
| WO | 2012/098853 | 7/2012 |
| WO | 2018/061976 | 4/2018 |
| WO | 2019/155727 | 8/2019 |

OTHER PUBLICATIONS

Kim, Won-Suk. "Progressive traffic-oriented resource management for reducing network congestion in edge computing." Entropy 23.5 (2021): 532. (Year: 2021).*

Kanellopoulos, D.; Sharma, V.K. Dynamic Load Balancing Techniques in the IoT: A Review. Symmetry 2022, 14, 2554. https:// (Year: 2022).*

International Search Report issued Feb. 16, 2021 in International (PCT) Application No. PCT/JP2020/044081.

International Preliminary Report on Patentability dated Oct. 13, 2022 in International (PCT) Application No. PCT/JP2020/044081, with English language translation.

* cited by examiner

MOVING OBJECT DETECTION SYSTEM AND INFORMATION MANAGEMENT APPARATUS

BACKGROUND

1. Technical Field

The present disclosure relates to a moving object detection system that detects a plurality of moving objects based on a captured image, and an information management apparatus in the moving object detection system.

2. Related Art

Japanese Patent No. 6532234 discloses a monitoring system including one or more monitoring cameras, a monitoring server, and a mobile terminal carried by a user. The monitoring server of Japanese Patent No. 6532234 extracts a trajectory of a moving object such as a person based on a video of the monitoring camera, and selects a trajectory included in a peripheral region or the like of the mobile terminal. The monitoring server identifies a video of a region including a passing path of the trajectory, based on the selected trajectory, to present the video to the user. In Japanese Patent No. 6532234, presenting the video corresponding to the analysis result of the trajectory to the user helps improve the efficiency of the video checking work by the user.

SUMMARY

The present disclosure provides a moving object detection system that can efficiently perform processing detecting a plurality of moving objects in a captured image obtained using a plurality of cameras, and provides an information management apparatus in the moving object detection system.

A moving object detection system according to one aspect of the present disclosure detects a plurality of moving objects based on a captured image. The moving object detection system includes a plurality of cameras, a plurality of image recognition circuitries, and an information management apparatus. The plurality of cameras capture images at a predetermined cycle to generate image data. The plurality of image recognition circuitries each performs image recognition on the image data generated by each camera to detect a moving object in a captured image indicated by the image data. The information management apparatus manages image data supplied from each of the cameras to a corresponding one of the image recognition circuitries. The information management apparatus includes a communication interface that performs data communication with the cameras and the image recognition circuitries, and a controller that controls an operation of the communication interface. The controller manages congestion information indicating a quantity corresponding to the number of moving objects localized within a range of a captured image indicated by image data for each of the cameras, and controls, according to a magnitude of the quantity indicated by the congestion information, the communication interface to supply the image data generated by the plurality of cameras to each of the image recognition circuitries, distributing the image data.

An information management apparatus according to one aspect of the present disclosure is in a moving object detection system including: a plurality of cameras, and a plurality of image recognition circuitries. The respective image recognition circuitries, based on image data generated by each of the cameras, is operable to recognize a plurality of moving objects in a captured image indicated by the image data. The information management apparatus includes: a communication interface to perform data communication with the cameras and the image recognition circuitries, and a controller to control an operation of the communication interface to manage image data supplied from the cameras to the image recognition circuitries. The controller manages congestion information indicating a quantity corresponding to the number of moving objects localized within a range of a captured image indicated by each piece of image data for each camera, and controls, according to a magnitude of the quantity indicated by the congestion information, the communication interface to supply image data generated by the plurality of cameras to the image recognition circuitries, distributing the image data.

According to the moving object detection system and the information management apparatus of the present disclosure, it is possible to efficiently perform processing of detecting a plurality of moving objects in a captured image.

DETAILED DESCRIPTION

Hereinafter, embodiments will be described in detail with reference to the drawings. However, a detailed description more than necessary may be omitted. For example, a detailed description of already well-known matters and a redundant description for substantially the same configuration may be omitted. This is to avoid the unnecessary redundancy of the following description and to facilitate understanding by those skilled in the art. It should be noted that the inventor(s) provides (provide) the accompanying drawings and the following description for a person skilled in the art to fully understand the present disclosure. Thus, the drawings and the description are not intended to limit the subject matter defined in the claims.

First Embodiment

1. Configuration

Figure 1:
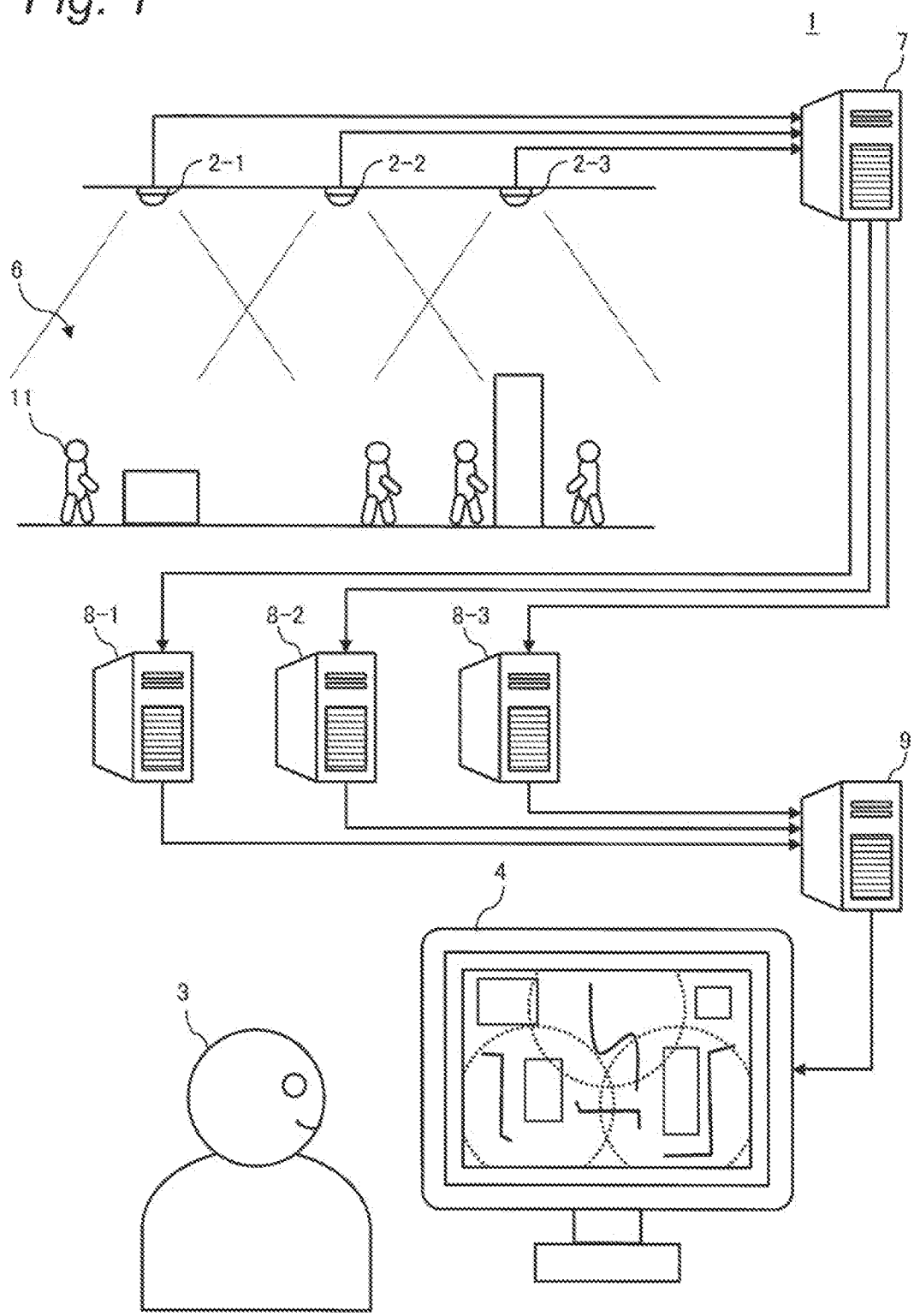
FIG. 1 is a diagram showing an overview of a trajectory detection system according to a first embodiment of the present disclosure.

A trajectory detection system according to a first embodiment will be described with reference to FIG. 1. FIG. 1 is a diagram showing an overview of the trajectory detection system 1 according to the present embodiment.

1-1. Overview of Trajectory Analysis System

As shown in FIG. 1, the present system 1 includes a plurality of cameras 2-1 to 2-3, a congestion management server 7, a plurality of trajectory extraction servers 8-1 to 8-3, and a trajectory integration server 9. Hereinafter, the cameras 2-1, 2-2, and 2-3 are also collectively referred to as a "camera 2". In addition, the trajectory extraction servers 8-1, 8-2, and 8-3 are also collectively referred to as a "trajectory extraction server 8".

The present system 1 is an example of a moving object detection system that uses a plurality of cameras 2 to capture images of an entire environment 6, with a path (i.e., a trajectory) as a detection target. The trajectory is where each of a plurality of persons 11 and the like moves in the environment 6 such as a store sales floor, a workplace, or a factory. The present system 1 may include a display terminal 4 to present trajectories of various persons 11 in the environment 6 to a user 3 such as a manager or a person in charge of analysis of the environment 6.

In the present system 1, each of the trajectory extraction servers 8-1, 8-2, and 8-3 is provided corresponding to the respective cameras 2-1, 2-2, and 2-3. The trajectory extraction server 8 is a server apparatus that performs image recognition processing to extract a trajectory from an image captured by the camera 2. The congestion management server 7 is a server apparatus managing image data supplied from the respective cameras 2-1, 2-2, and 2-3 to the trajectory extraction servers 8-1, 8-2, and 8-3. The trajectory integration server 9 is a server apparatus generating information in which trajectories and the like extracted by the respective trajectory extraction servers 8-1, 8-2, 8-3 are integrated.

In the present embodiment, by using the congestion management server 7 in the trajectory detection system 1 as described above, trajectories and the like of the entire environment 6 can be easily obtained in real time even if congestion occurs due to a large number of persons 11.

Hereinafter, a specific configuration of each of the camera 2, the congestion management server 7, the trajectory extraction server 8, and the trajectory integration server 9 in the present system 1 will be described.

1-2. Configuration of Camera

The camera 2 is an example of a camera in the present system 1. The camera 2 includes an imager that captures an image, and a transmitter that transmits image data indicating the image captured by the imager. The imager is achieved with a CCD image sensor, a CMOS image sensor, or the like. The transmitter includes an interface circuit for communicating with an external apparatus in conformity with a predetermined communication standard (such as IEEE 802.11, or USB).

The camera 2 of the present embodiment is an omnidirectional camera including a fisheye lens, for example. The camera 2 of the present system 1 may be various cameras not particularly limited to an omnidirectional camera. In addition, in FIG. 1, three cameras 2-1, 2-2, and 2-3 are illustrated, but the number of cameras 2 included in the present system 1 is not particularly limited to three, and may be two or four or more.

In the present system 1, for example, from the viewpoint of accurately detecting the trajectory of the person 11 moving in various places in the environment 6, the imaging ranges imaged by the respective cameras 2-1, 2-2, and 2-3 in the environment 6 are set to be partially superposed on each other, for example.

1-3. Configuration of Congestion Management Server

Figure 2:
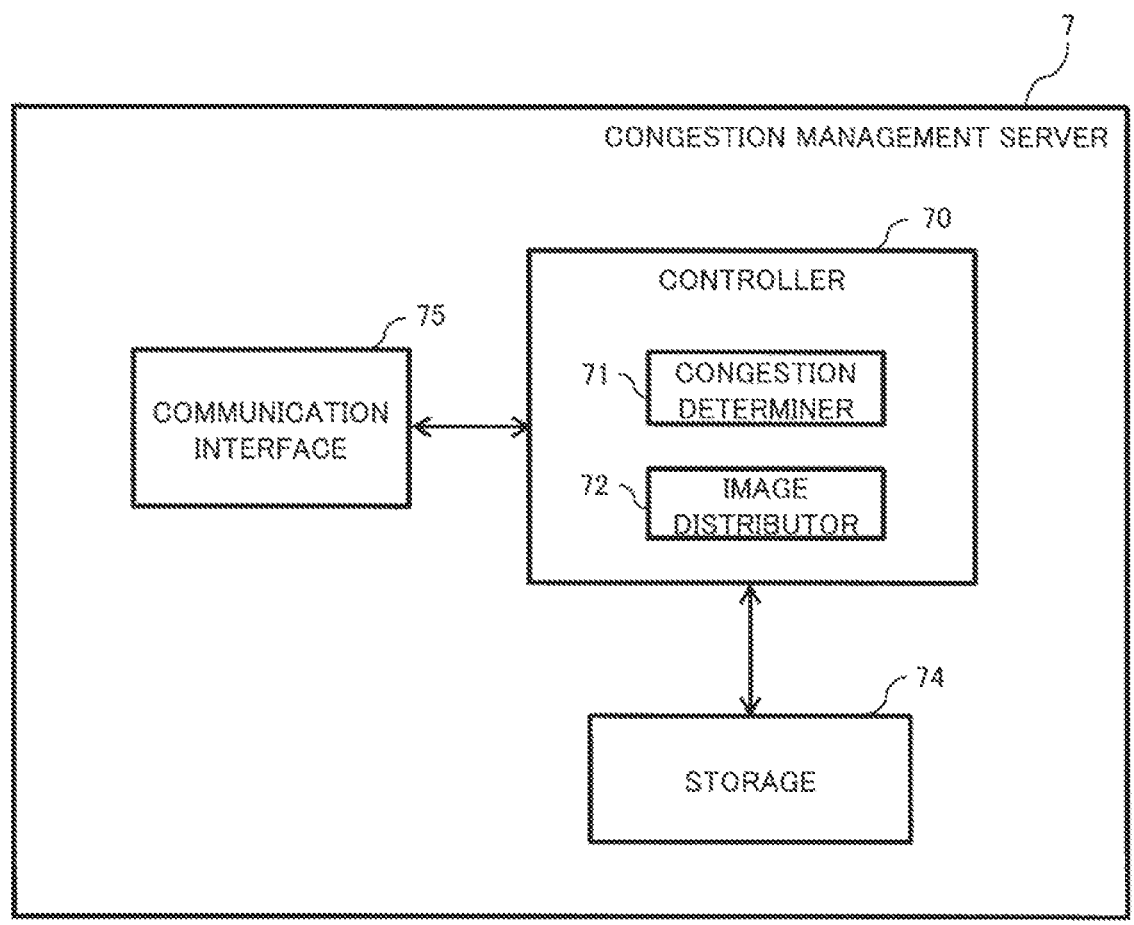
FIG. 2 is a block diagram illustrating a configuration of a congestion management server of the first embodiment.

FIG. 2 is a block diagram illustrating a configuration of a congestion management server 7 of the present embodiment. The congestion management server 7 is an example of an information management apparatus in the present embodiment. The congestion management server 7 illustrated in FIG. 2 includes a controller 70, a storage 74, and a communication interface 75.

The controller 70 controls the operation of the congestion management server 7. The controller 70 is implemented with a CPU or an MPU that achieves a predetermined function in cooperation with software, for example. The controller 70 reads data and programs stored in the storage 74, performs various pieces of arithmetic processing, and achieves various functions. For example, the controller 70 executes a program including a command group for achieving various types of processing of the congestion management server 7. For example, the above program is an application program, and may be provided from a communication network such as the Internet or may be stored in a portable storage medium.

In the congestion management server 7 illustrated in FIG. 2, the controller 70 includes a congestion determiner 71 and an image distributor 72 as functional configurations, for example. The congestion determiner 71 performs congestion determination processing which is processing to determine whether or not the captured image of each of the cameras 2-1, 2-2, and 2-3 is in a congestion state described below. The image distributor 72 determines distribution destinations to which the image data from the plurality of cameras 2 is distributed among the plurality of trajectory extraction servers 8 based on the result of the congestion determination processing, and performs image distribution processing which is processing to transmit the image data to the respective trajectory extraction servers 8-1, 8-2, and 8-3.

The controller 70 may be a hardware circuit such as a dedicated electronic circuit designed to achieve a predetermined function or a reconfigurable electronic circuit. The controller 70 may include a semiconductor integrated circuit such as a microcomputer, a DSP, an FPGA, and an ASIC. In addition, the controller 70 may include an internal memory as a temporary storage area that holds various types of data and programs.

The storage 74 stores data and programs. The storage 74 is implemented with a hard disk drive (HDD) or a solid-state drive (SSD), for example. The storage 74 stores image data acquired from the plurality of cameras 2. The storage 74 may include a temporary storage element including a RAM such as a DRAM or an SRAM, and may function as a work area of the controller 70. For example, the storage 74 may temporarily store the determination result of the congestion determiner 71 and the determination result of the distribution destination by the image distributor 72.

The communication interface 75 is a connection circuit that performs connection between apparatuses, data communication, and the like in conformity with a standard such as USB, IEEE 802.11, or Bluetooth, for example. For example, the communication interface 75 connects the plurality of cameras 2, the plurality of trajectory extraction servers 8, and the congestion management server 7. The communication interface 75 may include a circuit for connecting to a communication network, and may communicate data with the plurality of cameras 2 and the plurality of trajectory extraction servers 8 through the communication network, for example.

1-4. Configuration of Trajectory Extraction Server

Figure 3:
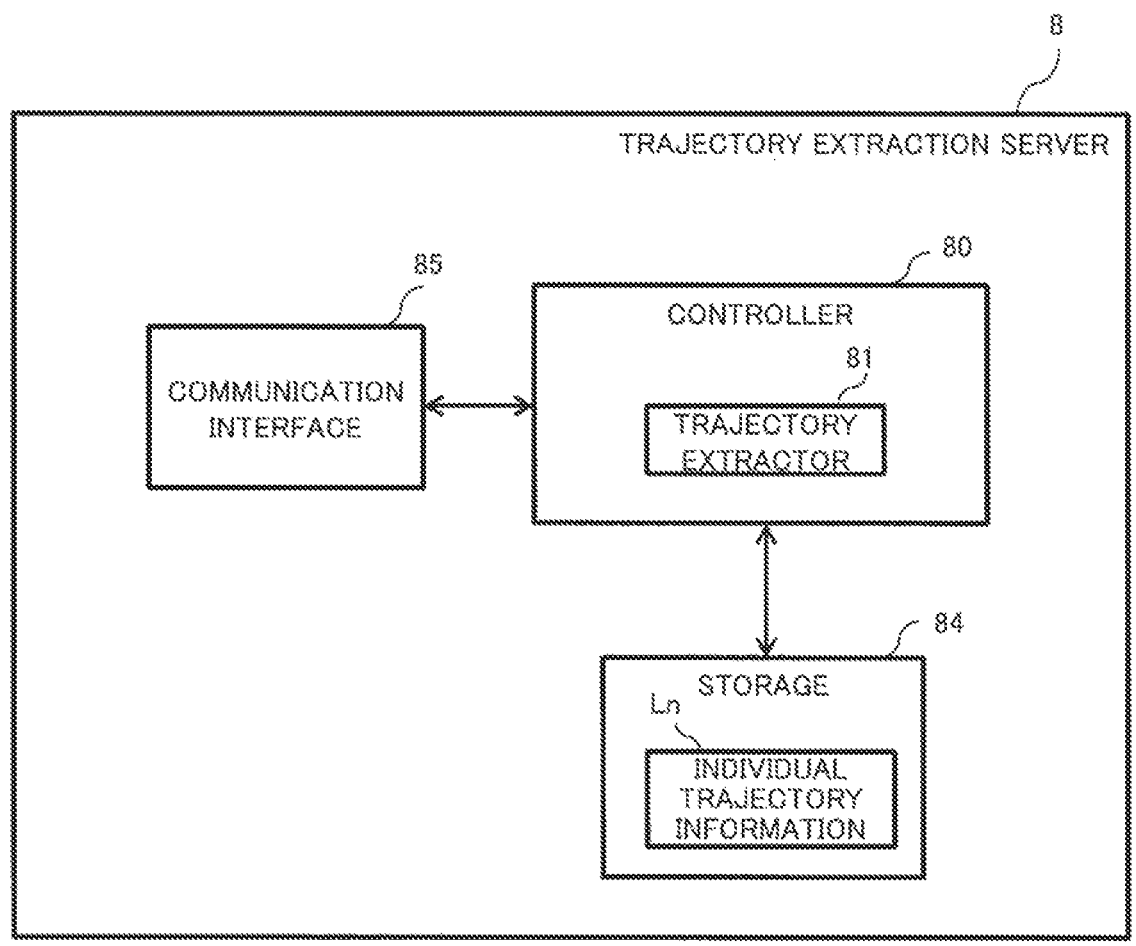
FIG. 3 is a block diagram illustrating a configuration of a trajectory extraction server of the first embodiment.

FIG. 3 is a block diagram illustrating a configuration of the trajectory extraction server 8 of the present embodiment. The trajectory extraction server 8 is an example of an image recognition circuitry in the present embodiment. The trajectory extraction server 8 illustrated in FIG. 3 includes a controller 80, a storage 84, and a communication interface 85.

The controller 80 controls an operation of the trajectory extraction server 8. The controller 80 is implemented with a CPU, an MPU, a GPU, a GPGPU, or a TPU that achieves a predetermined function in cooperation with software, or a combination thereof, for example. The controller 80 reads data and programs stored in the storage 84, and performs various types of arithmetic processing to achieve various functions.

In the trajectory extraction server 8 illustrated in FIG. 3, the controller 80 includes a trajectory extractor 81 as a functional configuration, for example. Based on the image data received from the congestion management server 7, the trajectory extractor 81 performs trajectory extraction processing including image recognition processing to detect an object such as the person 11 set in advance as a target of image recognition. In the trajectory extraction processing, positional information on the person 11 and the like is calculated based on a detection result by image recognition. The trajectory extractor 81 generates individual trajectory information Ln indicating the trajectory based on the positional information calculated with the image data generated by the camera 2-1 corresponding to the trajectory extraction server 8-1, and accumulates the individual trajectory information Ln in the storage 84. For the image recognition processing in trajectory extractor 81, a learned model or the like by various types of machine learning is applied, for example.

The controller 80 may be a hardware circuit such as a dedicated electronic circuit designed to achieve a predetermined function or a reconfigurable electronic circuit. The controller 80 may be implemented with a semiconductor integrated circuit such as a microcomputer, a DSP, an FPGA, and an ASIC. In addition, the controller 80 may include an internal memory as a temporary storage area that holds various types of data and programs.

The storage 84 stores data and programs. The storage 84 is implemented with a HDD or a SSD, for example. The storage 84 stores individual trajectory information Ln. The storage 84 may include a temporary storage element including a RAM such as a DRAM or an SRAM, and may function as a work area of the controller 80.

The communication interface 85 is a connection circuit that performs connection between apparatuses, data communication, and the like in conformity with a standard such as USB, IEEE 802.11, or Bluetooth, for example. The communication interface 85 is communicably connected to the congestion management server 7 and the trajectory integration server 9, for example. The communication interface 85 may be communicably connected to another trajectory extraction server 8. The communication interface 85 may include a circuit for connecting to a communication network, and data communication may be performed among the plurality of trajectory extraction servers 8 through the communication network, for example.

1-5. Configuration of Trajectory Integration Server

Figure 4:
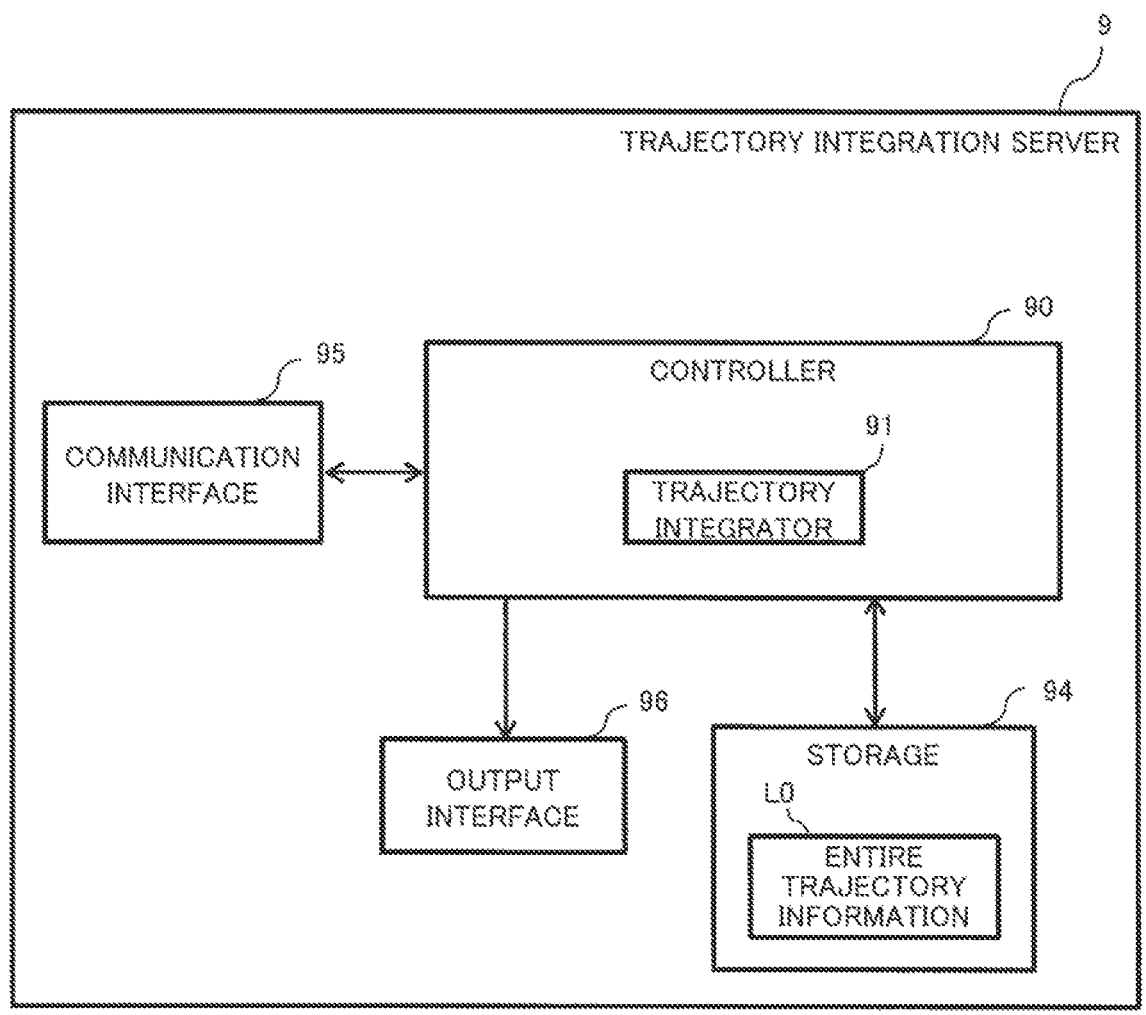
FIG. 4 is a block diagram illustrating a configuration of a trajectory integration server of the first embodiment.

FIG. 4 is a block diagram illustrating a configuration of the trajectory integration server 9 of the present embodiment. The trajectory integration server 9 is an example of an information integration apparatus in the present embodiment. The trajectory integration server 9 illustrated in FIG. 4 includes a controller 90, a storage 94, a communication interface 95, and an output interface 96.

The controller 90 controls operation of the trajectory integration server 9. The controller 90 is implemented with a CPU or an MPU that achieves a predetermined function in cooperation with software, for example. The controller 90 reads data and programs stored in the storage 94, performs various types of arithmetic processing, and achieves various functions.

In the trajectory integration server 9 illustrated in FIG. 4, the controller 90 includes a trajectory integration unit 91 as a functional configuration, for example. The trajectory integration unit 91 couples the respective pieces of individual trajectory information L1 and the like received from the trajectory extraction servers 8-1, 8-2, and 8-3, generates entire trajectory information L0 based on the image data from the plurality of cameras 2, and stores the entire trajectory information L0 in the storage 94.

The controller 90 may be a hardware circuit such as a dedicated electronic circuit designed to achieve a predetermined function or a reconfigurable electronic circuit. The controller 90 may include a semiconductor integrated circuit such as a microcomputer, a DSP, an FPGA, and an ASIC. In addition, the controller 90 may include an internal memory as a temporary storage area that holds various types of data and programs.

The storage 94 stores data and programs. The storage 94 is implemented with a HDD or a SSD, for example. The storage 94 stores the entire trajectory information L0. The storage 94 may include a temporary storage element including a RAM such as a DRAM or an SRAM, and may function as a work area of the controller 90.

The communication interface 95 is a connection circuit that performs connection between apparatuses, data communication, and the like in conformity with a standard such as USB, IEEE 802.11, or Bluetooth, for example. The communication interface 95 communicably connects the plurality of trajectory extraction servers 8 and the trajectory integration server 9, for example. The communication interface 95 may include a circuit for connecting to a communication network, and for example, data communication may be performed with the plurality of trajectory extraction servers 8 and the like through the communication network.

The output interface 96 is an example of an output circuitry that outputs information. The output interface 96 is an output interface circuit for video signals and the like in conformity with the HDMI standard and the like, for example. The output interface 96 outputs a signal to an external display device such as a monitor, a projector, or a head mounted display in order to display various types of information. In addition, the output circuitry of the information integration apparatus is not limited to the output interface 96, and may be configured as a display device such as a liquid crystal display or an organic EL display, for example.

2. Operation 2-1. Overview of Operation

Figure 5:
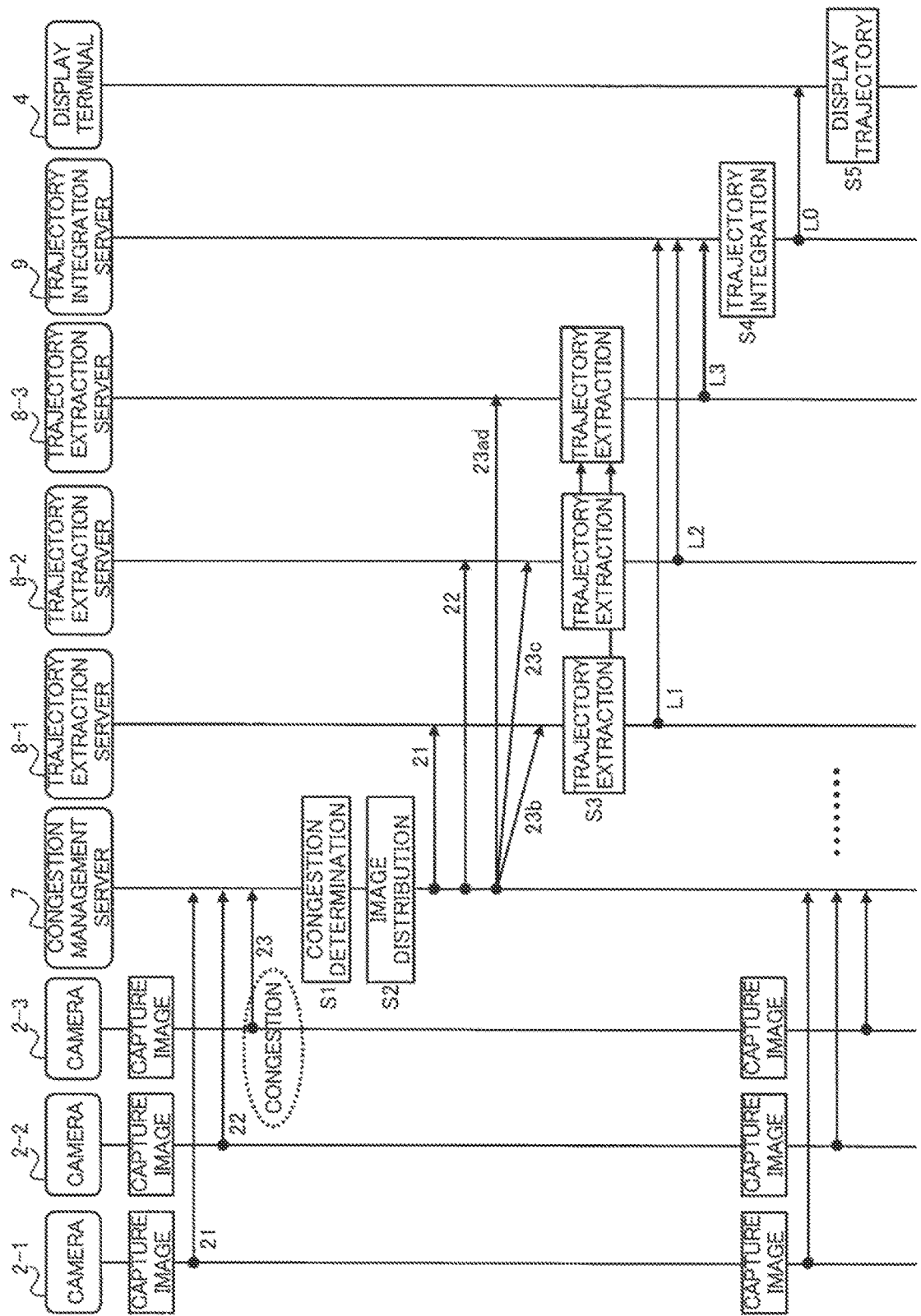
FIG. 5 is a diagram for illustrating an operation example of a trajectory detection system.

An overview of an operation of the trajectory detection system 1 according to the present embodiment will be described with reference to FIGS. 1 and 5. FIG. 5 is a diagram for illustrating an operation example of the trajectory detection system 1 according to the present embodiment.

In the trajectory detection system 1, each of the cameras 2-1, 2-2, and 2-3 captures an image in the respective imaging ranges in the environment 6 to generate image data in a frame cycle of a moving image, for example. Each of the cameras 2-1, 2-2, and 2-3 sequentially transmits the corresponding image data to the congestion management server 7 in association with an imaging time synchronized with each other, for example.

The congestion management server 7 in the present embodiment acquires image data of the respective images captured by the cameras 2-1, 2-2, and 2-3, and performs processing as the congestion determiner 71 and the image distributor 72 (see S1 and S2 in FIG. 5), for example. For example, when a congestion state described below does not particularly occur, the congestion management server 7 transmits image data from each of the cameras 2-1, 2-2, and 2-3 to a corresponding one of the trajectory extraction servers 8-1, 8-2, and 8-3.

The trajectory extraction servers 8-1, 8-2, and 8-3 respectively perform image recognition processing on the captured images by the plurality of cameras 2-1, 2-2, and 2-3 in parallel based on the received image data to detect trajectories of the person 11 and the like (see S3 in FIG. 5). Each of the trajectory extraction servers 8-1, 8-2, and 8-3 generates individual trajectory information indicating a corresponding one of detection results and transmits the individual trajectory information to the trajectory integration server 9.

The trajectory integration server 9 integrates information on the trajectories and the like detected by the plurality of trajectory extraction servers 8 so that trajectories are displayed on a map image showing a map of the environment 6 on the display terminal 4 (see S4 in FIG. 5), for example.

2-1-1. Operation During Congestion

An operation during congestion in the trajectory detection system 1 as described above will be described with reference to FIGS. 5 and 6A to 6F.

Figure 6:
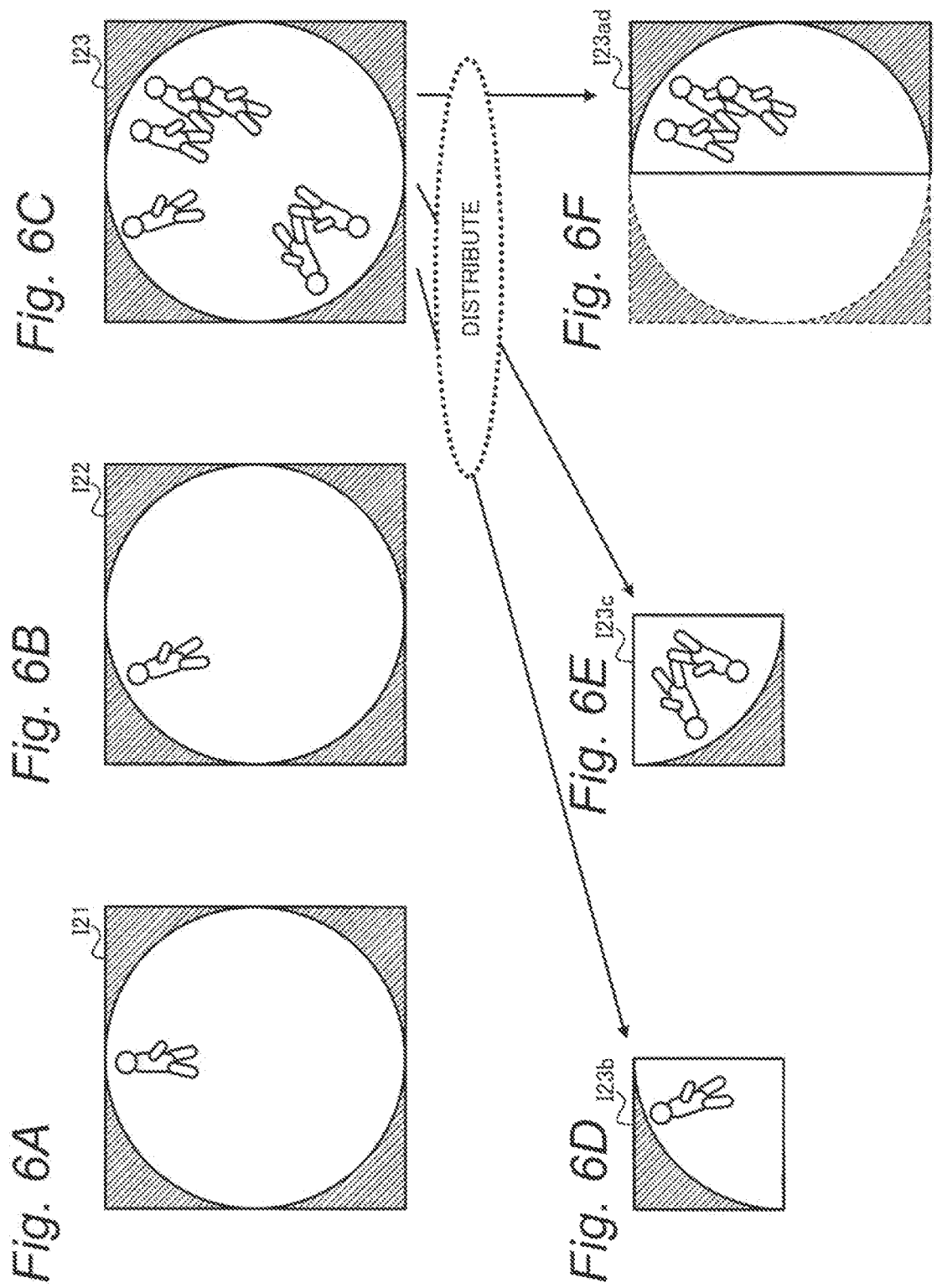
FIGS. 6A to 6F are diagrams for illustrating an operation of the trajectory detection system during congestion.

FIG. 5 illustrates the operation of the present system 1 when only the imaging range of the specific camera 2-3 in the environment 6 is congested by persons 11. FIGS. 6A, 6B, and 6C illustrate captured images 121, 122, and 123 by the cameras 2-1, 2-2, and 2-3 in the operation example in FIG. 5, respectively. The state of the captured image 123 during congestion is referred to as "congestion state", and the states of the captured images 121 and 122 that are not in the congestion state are referred to as "non-congestion state".

According to the captured image 123 in the congestion state, since a large number of persons are localized within the range of the image 123, it is presumed that the processing load of the trajectory extraction server 8-3 that performs image recognition becomes excessive. In this case, a delay in the processing of a specific trajectory extraction server 8-3 among the plurality of trajectory extraction servers 8-1 to 8-3 delays the processing of the trajectory integration server 9, and eventually (S4), makes it difficult to achieve real-time trajectory display.

Thus, in the trajectory detection system 1 of the present embodiment, the congestion management server 7 manages the congestion state in the captured images 121 to 123.

First, the congestion management server 7 causes the congestion determiner 71 to perform congestion determination processing (S1) on each of the cameras 2-1, 2-2, and 2-3. In the example in FIG. 5, only the captured image 123 of the specific camera 2-3 is determined to be in the congestion state, and the captured images 121 and 122 by the remaining cameras 2-1 and 2-2 are determined not to be in the congestion state.

Next, the congestion management server 7 causes the image distributor 72 to perform image distribution processing (S2) on the image data 21, 22, and 23 according to the result of the congestion determination processing (S1). The image distributor 72 transmits the image data 21 and 22 generated by the cameras 2-1 and 2-2, which are determined to be in the non-congestion state, to the trajectory extraction servers 8-1 and 8-2 corresponding to the cameras 2-1 and 2-2, respectively. On the other hand, the image distributor 72 distributes the image data 23 generated by the camera 2-3, which is determined to be in the congestion state, to the plurality of trajectory extraction servers 8 dividing the captured image 123. An example of the distribution is shown in FIGS. 6C to 6F.

FIGS. 6D, 6E, and 6F illustrate divided images I23*b*, I23*c*, and I23*ad* into which the captured image 123 in FIG. 6C is divided. In the example in FIG. 5, the congestion management server 7 distributes the image data 23*ad*, 23*b*, and 23*c* indicating the divided images I23*ad*, I23*b*, and I23*c* to supplies these image data 23*ad*, 23*b*, and 23*c* not only to the specific trajectory extraction server 8-3 but also to the other trajectory extraction servers 8-1 and 8-2.

Each of the trajectory extraction servers 8-1, 8-2, and 8-3 causes the respective trajectory extractors 81 to perform image recognition processing on the image data supplied from the congestion management server 7, and performs trajectory extraction processing extracting trajectories based on the image data from the corresponding cameras 2-1, 2-2, and 2-3 (S3). In this processing, since the processing target of the image recognition is reduced from the captured image 123 in the congestion state to the divided image I23*ad* as shown in FIGS. 6C and 6F, processing load in the above-described specific trajectory extraction server 8-3 is reduced. On the other hand, the remaining divided images I23*b* and I23*c* are processed by the other trajectory extraction servers 8-1 and 8-2 together with the captured images 121 and 122 not in the congestion state.

Therefore, the processing load is distributed among the plurality of trajectory extraction servers 8-1 to 8-3, and the trajectory extraction processing (S3) can be efficiently performed. In addition, in the present embodiment, the plurality of trajectory extraction servers 8-1 to 8-3 mutually transmit and receive the information on the detection results of the image recognition of the divided images I23*ad*, I23*b*, and I23*c*, thereby generating the individual trajectory information L1, L2, and L3 based on the image data from the corresponding cameras 2-1 to 2-3, respectively. The trajectory extraction servers 8-1, 8-2, and 8-3 respectively transmit the individual trajectory information L1, L2, and L3 to the trajectory integration server 9.

The trajectory integration server 9 performs trajectory integration processing integrating received individual trajectory information L1, L2, and L3 to generate entire trajectory information L0 (S4). The trajectory integration server 9 transmits the entire trajectory information L0 to the display terminal 4 together with map image data indicating a map image of the environment 6 stored in advance in the storage 94, for example. Consequently, the display terminal 4 displays a trajectory indicated by the entire trajectory information L0 with the trajectory superimposed on the map image (S5).

The trajectory detection system 1 repeats the above processing (S1 to S5) periodically, for example. Accordingly on the display terminal 4, the display of the trajectory is updated in real time, for example.

According to the above operations, even when the captured image I23ad in the congestion state occurs, the processing load is distributed among the plurality of trajectory extraction servers 8-1 to 8-3, and the trajectory extraction processing (S3) can be efficiently performed. Therefore, a delay of subsequent trajectory integration processing (S4) or the like can also be suppressed, and the real-time display of trajectories on the display terminal 4 can be easily performed, for example.

According to this traffic line detection system 1, image data from the plurality of cameras 2 is distributed to the plurality of traffic line extraction servers 8 (S2) according to the result of the congestion determination processing (S1). Accordingly in the trajectory extraction server 8-3 corresponding to the camera 2-3 determined to be congested, it is possible to prevent the processing from being delayed due to concentration of the load of the image recognition processing in the trajectory extraction processing (S3), for example. The result of the congestion determination processing (S1) also changes according to the movement of the persons 11 and the like in the environment 6, and the division and distribution of the image in the image distribution processing (S2) are updated so that the trajectory integration processing (S4) and the display of the trajectory (S5) can be performed in real time.

2-2. Congestion Determination Processing

The congestion determination processing (S1 in FIG. 5) in the congestion management server 7 will be described with reference to FIGS. 7 and 8. In the congestion determination processing (S1), congestion information of each camera 2 is used. The congestion information is various types of information indicating the degree of congestion due to the moving objects corresponding to the number of persons 11 in the captured image by each of the plurality of cameras 2.

Figure 7:
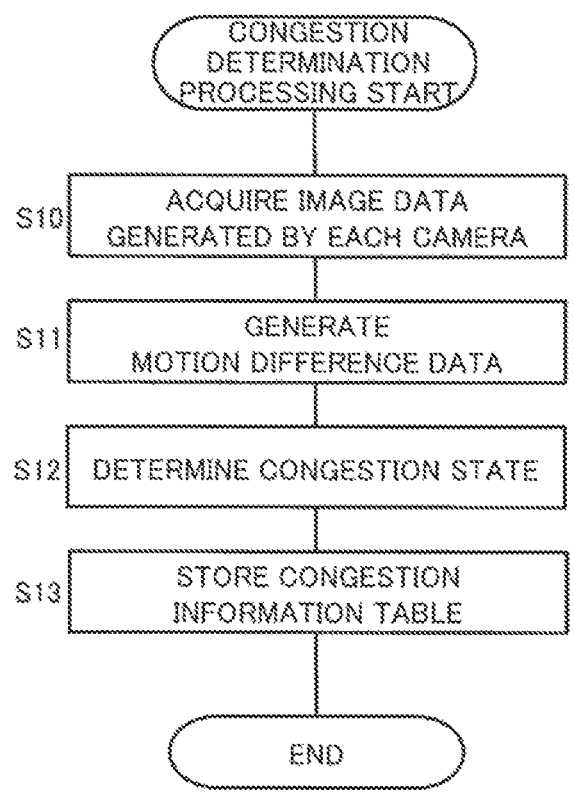
FIG. 7 is a flowchart illustrating congestion determination processing in the congestion management server of the first embodiment.
Figure 8A:
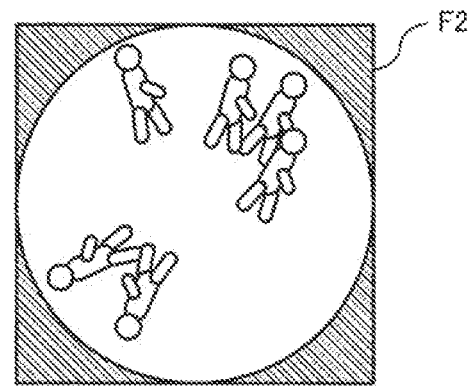
FIGS. 8A to 8C are diagrams for illustrating congestion determination processing of the first embodiment.
Figure 8B:
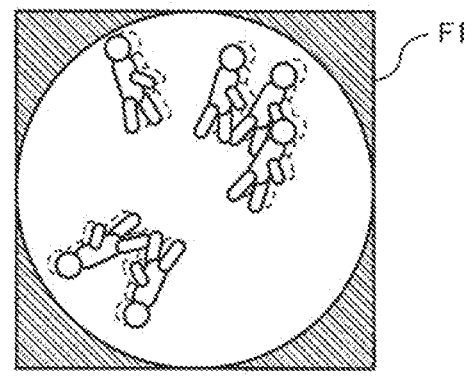
Figure 8C:
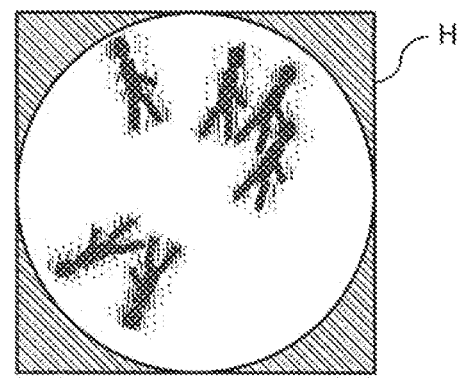
Figure 9:
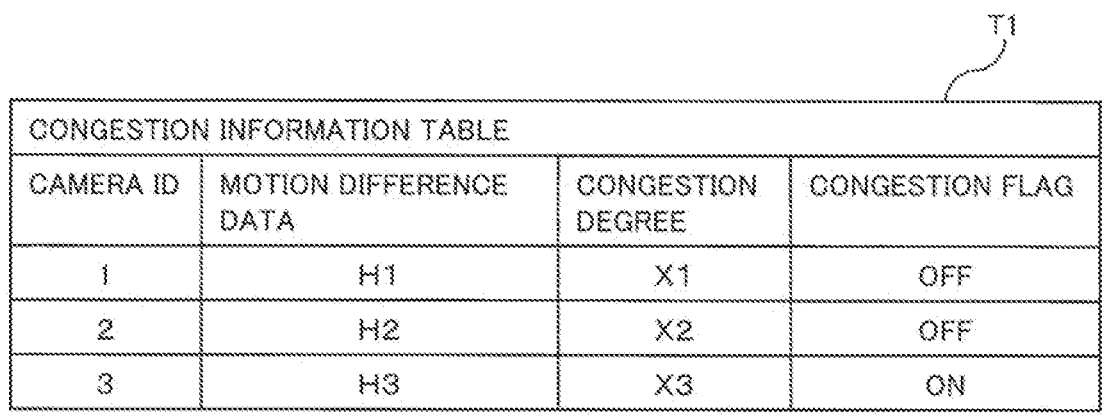
FIG. 9 is a diagram illustrating a congestion information table in congestion determination processing of the first embodiment.

FIG. 7 is a flowchart illustrating congestion determination processing (S1) in the congestion management server 7. FIGS. 8A to 8C are diagrams for illustrating congestion determination processing. FIG. 9 is a diagram illustrating a congestion information table in congestion determination processing.

Each piece of processing shown in the flowchart of FIG. 7 is performed by the controller 70 of the congestion management server 7 functioning as the congestion determiner 71 in a frame cycle of the camera 2, for example. The flowchart in FIG. 7 is started when the congestion management server 7 receives image data from the plurality of cameras 2 through the communication interface 75, for example. The image data is held in the storage 74 for a predetermined number of frames such as two frames for each camera 2, for example.

In the flowchart in FIG. 7, first, the congestion determiner 71 acquires image data generated by each camera 2 from the storage 74, for example (S10). FIGS. 8A and 8B illustrate image data acquired in step S10. FIG. 8A illustrates image data for the current frame F2 captured by one camera 2. FIG. 8B illustrates image data of the past frame F1 one frame before by the same camera 2 as in FIG. 8A. In step S10, the congestion determiner 71 acquires current and past image data as in FIGS. 8A and 8B for each camera 2.

Each congestion determiner 71 generates the motion difference data H for the respective cameras 2-1 to 2-3 based on the acquired image data (S11). FIG. 8C illustrates motion difference data H generated based on the image data in FIGS. 8A and 8B. The motion difference data H is data indicating a difference due to motion from the past to the present as a heat map in the entire region of the captured image, for example. The congestion determiner 71 compares the image data of the past frame F1 with the image data of the current frame F2 for each pixel by calculating a difference between frames in each pixel to generate the motion difference data H, for example.

Next, the congestion determiner 71 determines a congestion state in the captured image by each camera 2 based on the motion difference data H1, H2, and H3 respectively for the plurality of cameras 2-1 to 2-3 (S12). The congestion determiner 71 calculates a total value of the motion difference data H over all pixels as the congestion degree of the current frame F2 per one camera 2, and determines the congestion state or the non-congestion state depending on whether the congestion degree is equal to or greater than a predetermined threshold value, for example. The predetermined threshold value is set based on a correlation between the number of people and the motion difference in consideration of the number of people in which a processing load is excessive within the range of the captured image, for example. The congestion determiner 71 performs the above processing on the motion difference data H1, H2, and H3 for the respective cameras 2.

Next, the congestion determiner 71 stores a congestion information table T1 storing congestion information for each camera 2 such as the above determination result in the storage 74 of the congestion management server 7, for example (S13). FIG. 9 illustrates a congestion information table T1.

In the example in FIG. 9, the congestion information table T1 stores each of the above-described "motion difference data", the above-described "congestion degree", and the "congestion flag" indicating the determination result of the congestion state each as an example of the congestion information in association with the "camera ID" identifying each of the plurality of cameras 2-1 to 2-3. In accordance with the determination result of the congestion state or the non-congestion state for each camera 2, the congestion determiner 71 sets the congestion flag to "ON" or "OFF".

In the example in FIG. 9, congestion information such as the motion difference data H1, H2, and H3 and the congestion degrees X1, X2, and X3 for the respective cameras 2-1, 2-2, and 2-3 is stored in the congestion information table T1. Furthermore, in the congestion information table T1 in FIG. 9, as the congestion information with the camera ID "3", a determination result that the congestion flag is "on", that is, "congestion state" is obtained based on the motion difference data H3 for the camera 2-3, for example.

Referring back to FIG. 7, when storing the congestion information table T1 (S13), the congestion determiner 71 ends the processing according to the flowchart in FIG. 7.

As described above, in the congestion management server 7 of the present embodiment, the congestion determiner 71 acquires image data from each camera 2 in the present system 1 (S10) and generates various types of current congestion information (S11, S12). Accordingly, the congestion management server 7 can manage various types of congestion information on the image data for each camera 2. In addition, according to the motion difference data H (S11), it is possible to calculate the congestion degree according to the number of people within the range of the captured image of each camera 2 without particularly using image recognition.

2-3. Image Distribution Processing

The image distribution processing (S2 in FIG. 5) in the congestion management server 7 will be described with reference to FIGS. 10, 11A, and 11B. In the image distribution processing (S2), a distribution destination to which the image data from each camera 2 is distributed in the plurality of trajectory extraction servers 8-1 to 8-3 is determined based on the congestion information for each camera 2.

Figure 10:
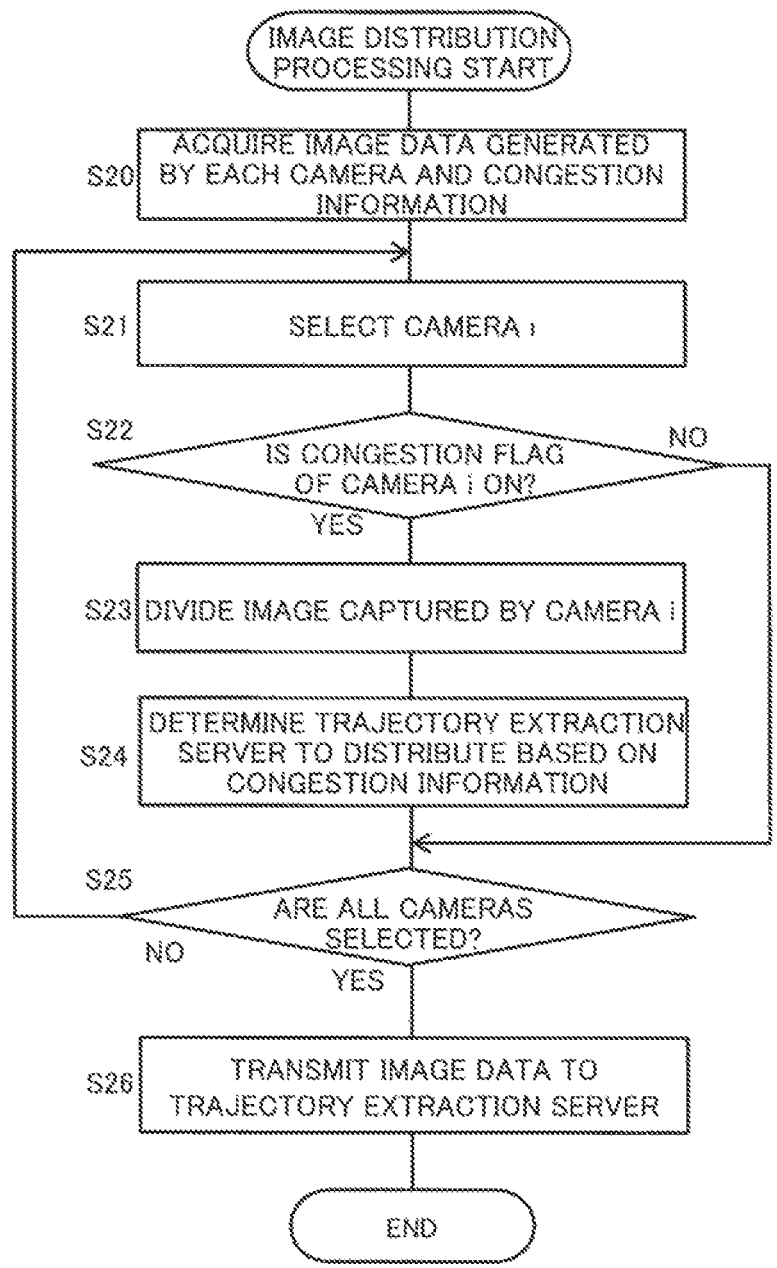
FIG. 10 is a flowchart illustrating image distribution processing in the congestion management server of the first embodiment.

FIG. 10 is a flowchart illustrating image distribution processing (S2) in the congestion management server 7. FIGS. 11A and 11B are diagrams for illustrating image distribution processing in the congestion management server 7.

Each piece of processing shown in the flowchart in FIG. 10 is performed by the controller 70 of the congestion management server 7 functioning as the image distributor 72. The flowchart in FIG. 10 is started in a state where the congestion information table T1 is stored (S13 in FIG. 7) by the operation of the congestion determiner 71, for example.

In the flowchart in FIG. 10, first, the image distributor 72 of the congestion management server 7 acquires the current image data generated by the plurality of cameras and various types of congestion information in the congestion information table T1 from the storage 74, for example (S20).

Next, the image distributor 72 selects one camera i from the plurality of cameras 2 (S21). In the example in FIG. 5, the cameras 2-1, 2-2, and 2-3 are selected sequentially for each step S21 as the camera i.

The image distributor 72 determines whether the congestion flag of the selected camera i is "ON" (S22), referring to the congestion information table T1 in FIG. 9, for example. The image distributor 72 makes the determination by referring to congestion information corresponding to the camera ID of the camera i. For example, in the example in FIG. 9, the congestion flag referred to is "OFF" when the camera 2-1 is selected.

When the congestion flag of the selected camera i is "OFF" (NO in S22), the corresponding captured image is determined to be in the non-congestion state. In this case, the image distributor 72 proceeds to step S25 without particularly performing the processing in steps S23 and S24.

The image distributor 72 determines whether all the cameras 2-1, 2-2, and 2-3 are already selected in step S21 (S25). Until all the cameras 2-1, 2-2, and 2-3 are selected (NO in S25), the image distributor 72 repeats the processing in and after step S21.

In the example in FIG. 5, if each of the cameras 2-1 and 2-2 is selected, the congestion flag is "OFF" in the congestion information table T1 (NO in S22), and thus the process proceeds to step S25. Then, since all the cameras are not selected yet (NO in S25), the camera 2-3 is selected (S21). In the congestion information table T1 in FIG. 9, the congestion flag referred to is "ON" when the camera 2-3 is selected.

When the congestion flag of the selected camera i is "ON" (YES in S22), the corresponding captured image is determined to be in the congestion state. In this case, the image distributor 72 performs processing dividing the captured image indicated by the image data from the camera i (S23).

Figure 11A:
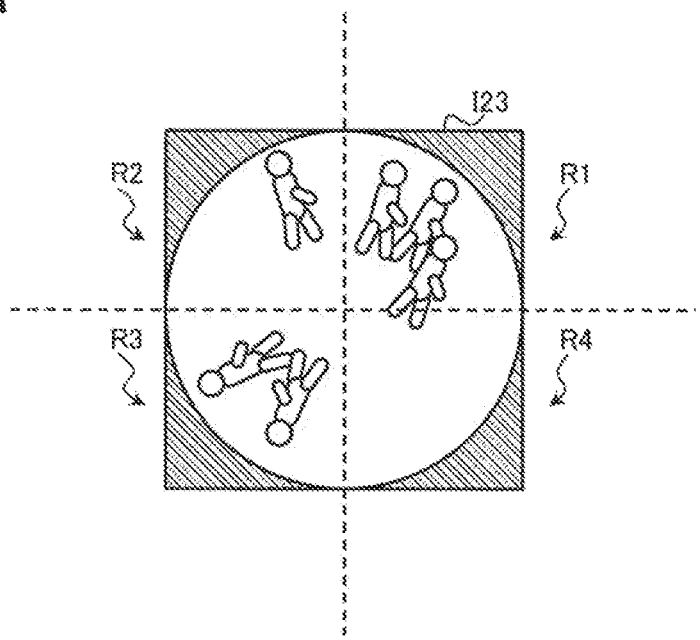
FIGS. 11A and 11B are diagrams for illustrating image distribution processing of the first embodiment.
Figure 11B:
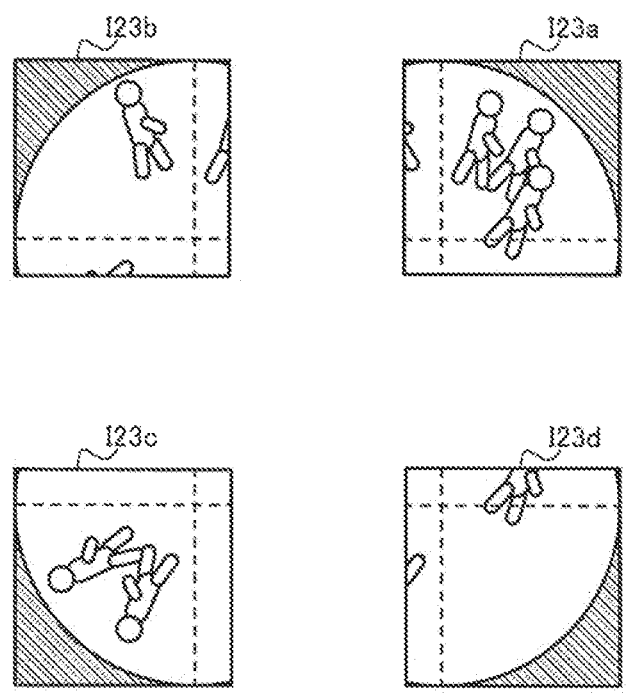

FIGS. 11A and 11B show a processing example in step S23. The image distributor 72 sets regions R1 to R4 obtained by dividing the captured image 123 indicated by the image data into a predetermined number of divisions (e.g., 4 or 9), for example. FIGS. 11A and 11B show an example when the number of divisions is "4". In the example in FIG. 11B, the divided images I23a to I23d corresponding to the respective regions R1 to R4 are set to be overlapped with each other at portions adjacent to each other.

In step S23, the image distributor 72, referring to the congestion information table T1 in FIG. 9, calculates the congestion degree of each of the divided images I23a to I23d similarly to step S12 in FIG. 7, for example. For example, when the calculated congestion degree is less than the predetermined threshold value for each of the divided images I23a to I23d, the image distributor 72 adopts that number of divisions "4". On the other hand, when the congestion degree equal to or greater than the predetermined threshold value is calculated, the image distributor 72 performs the above calculation again using a larger number of divisions. The predetermined threshold value is a value small enough to the extent that the trajectory extraction processing can be performed in real time in each of the plurality of trajectory extraction servers 8, and is set similarly to the threshold value in step S12, for example.

The image data indicating the divided images I23a to I23d is held in the internal memory of the controller 70 of the congestion management server 7 in association with each congestion degree, for example. Based on the above-described congestion degree, the image distributor 72 may form a divided image I23ad obtained by integrating two or more divided images I23a and I23d within a range less than the above threshold value (see FIG. 6F), for example.

In the example in FIG. 5, when the camera 2-3 is selected as the camera i in step S21, since the congestion flag of the corresponding congestion information in the congestion information table T1 is "ON" (YES in S22), the image 123 by the camera 2-3 is divided as shown in FIGS. 11A and 11B.

The image distributor 72 determines the trajectory extraction server 8 of the distribution destination to which the divided image captured by the selected camera i is to be distributed based on the congestion information of the plurality of cameras 2 (S24). The trajectory extraction server 8 corresponding to each camera 2 is set in advance as a supply destination of image data from the camera 2. For example, the image distributor 72, referring to the congestion information table T1, determines an additional distribution destination from the trajectory extraction servers 8 corresponding to the cameras whose congestion flags are "off". Then, the image distributor 72 determines distribution of the divided image to the trajectory extraction server 8 set in advance as the supply destination corresponding to the camera 2 whose congestion flag is "ON". In the example in FIG. 5, distribution destinations of divided images I23b and 123c are determined to be the trajectory extraction servers 8-1 and 8-2, respectively. Then, the distribution of the divided image I23*ad*, which is obtained by integrating the divided images I23*a* and I23*d*, to the trajectory extraction server 8-3 is determined.

In step S24, the image distributor 72 may determine the distribution destination so that the congestion degree of each trajectory extraction server 8 is within a predetermined range that can be regarded as the same degree, based on the congestion degree of each camera 2 in the congestion information table T1 and the congestion degree calculated for each divided image, for example. In addition, the congestion degree of each camera 2 in the congestion information table T1 may be updated in accordance with the determination of the distribution destination, and the subsequent processing may be performed based on the updated congestion information table T1.

If determining that all the cameras 2-1 to 2-3 have been selected (YES in S25), for example, the controller 70 as the image distributor 72 controls the communication interface 75 to transmit each piece of image data to the plurality of trajectory extraction servers 8 (S26). The image data of the captured image or divided image captured by each camera 2 is transmitted to the trajectory extraction server 8 corresponding to each camera 2. Furthermore, the image data of the divided image is transmitted to the trajectory extraction server 8 additionally determined as the distribution destination. In this processing, each piece of image data is transmitted in association with the camera ID of each camera 2, for example.

After transmitting the image data to the plurality of trajectory extraction servers 8 (S26), the image distributor 72 ends the processing shown in the present flowchart.

As described above, the image distributor 72 divides the captured image by the camera 2 determined as the "congestion state" among the captured images by the respective cameras 2 based on the congestion information of the plurality of cameras 2 (S22, S23), and distributes the divided captured image to the plurality of trajectory extraction servers 8 (S24). Accordingly, the processing load in each of the plurality of trajectory extraction servers 8 can be distributed.

In step S23, the threshold value of the congestion degree is not limited to the same value as in step S12 in FIG. 7, and may be set to a different value as appropriate. For example, based on the congestion information table T1, the image distributor 72 may calculate, as the threshold value, an average value of the congestion degrees of the plurality of cameras 2 regarded as being near the selected camera i. In this case a combination of cameras regarded as the vicinity of each camera is set in advance based on a positional relationship among the plurality of cameras 2, for example.

In addition, in step S23, dividing regions in the image may be performed so that each divided image is partially overlapped with an adjacent divided image as shown in FIG. 11B, for example. By dividing the images with the overlap, it is possible to reduce detection failure when a moving object such as the person 11 is detected at a boundary portion of the divided image in trajectory extraction processing by the plurality of trajectory extraction servers 8 as described below.

2-4. Trajectory Extraction Processing

Operation of the trajectory extraction server 8 will be described with reference to FIGS. 12 and 13A to 13C. Each of the trajectory extraction servers 8-1 to 8-3 performs trajectory extraction processing (S3 in FIG. 5) generating individual trajectory information based on image data from the camera 2 which corresponds to the trajectory extraction server 8 among the plurality of cameras 2-1 to 2-3.

Figure 12:
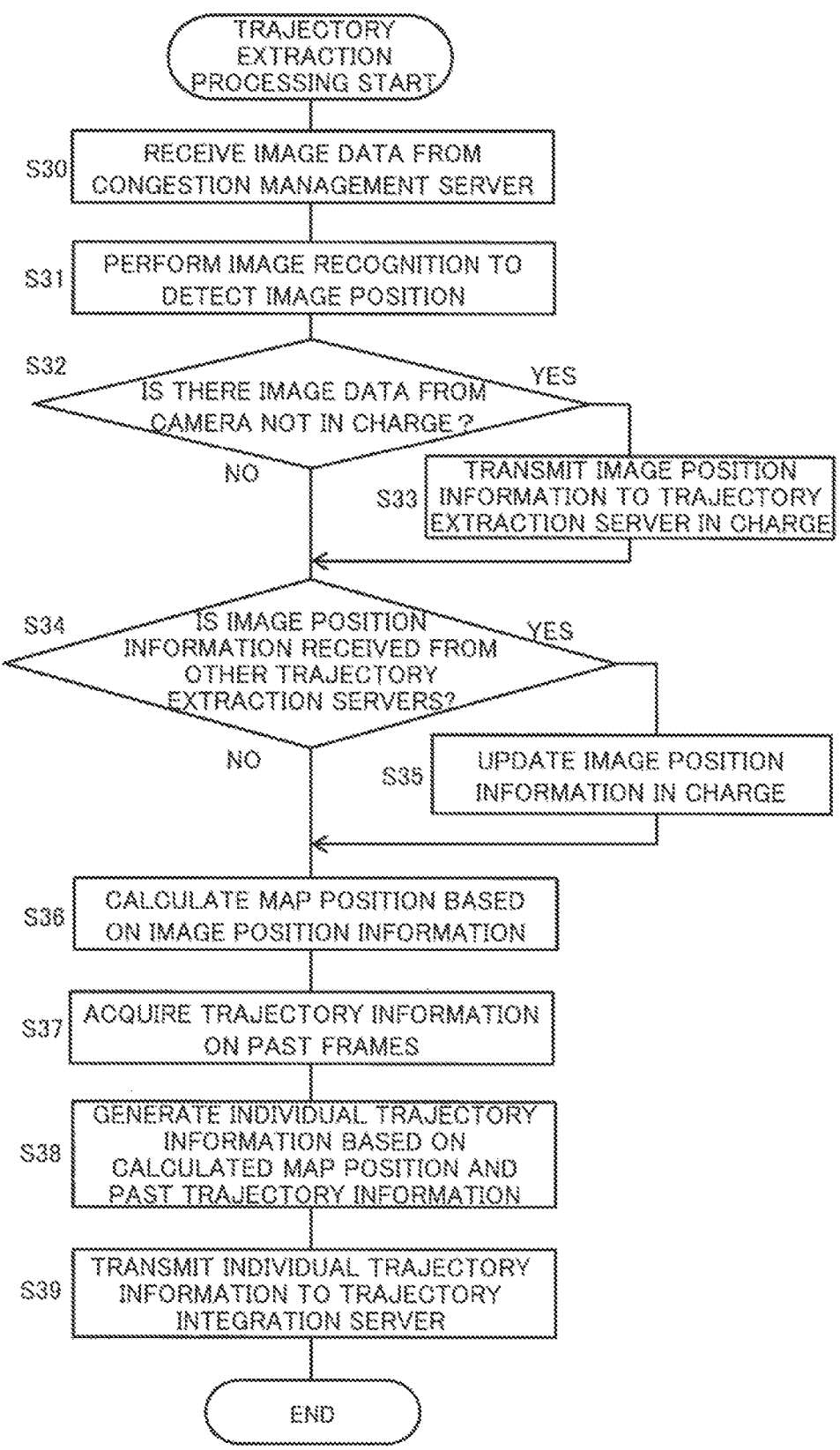
FIG. 12 is a flowchart illustrating trajectory extraction processing in the trajectory extraction server of the first embodiment.
Figure 13:
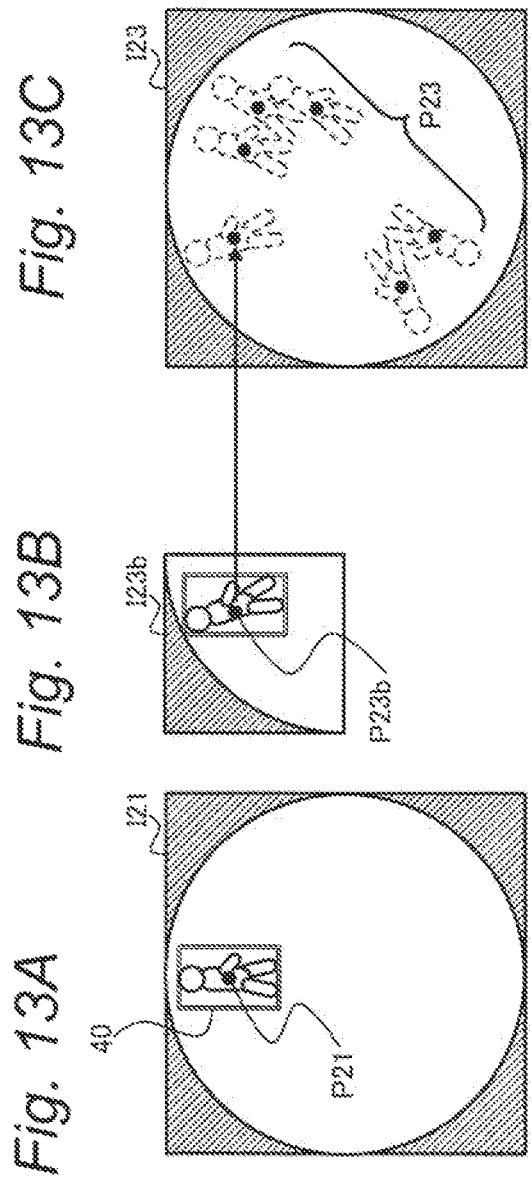
FIGS. 13A to 13C are diagrams for illustrating trajectory extraction processing of the first embodiment.

FIG. 12 is a flowchart illustrating trajectory extraction processing (S3) in the trajectory extraction server 8. FIGS. 13A to 13C are diagrams for illustrating the trajectory extraction processing. Each processing shown in the flowchart in FIG. 12 is performed by the controller functioning as the trajectory extractor 81 in each trajectory extraction server 8. The flowchart in FIG. 12 is started for every frame cycles of a moving image, for example.

In the flowchart in FIG. 12, first, the trajectory extractor 81 receives image data from the congestion management server 7 through the communication interface 85 (S30). For example, the trajectory extraction server 8-1 in the example in FIG. 5 receives image data 21 of the captured image 121 by the corresponding camera 2-1 (i.e., the camera in charge) and image data 23*b* of the divided image I23*b*.

The trajectory extractor 81 performs image recognition processing of object detection on the received image data, and detects an image position indicating a position on the image of persons 11 or the like being recognition targets (S31). Processing examples in step S31 are shown in FIGS. 13A and 13B.

FIG. 13A illustrates an image position P21 detected by the corresponding trajectory extraction server 8-1 in the captured image 121 in the non-congestion state. FIG. 13B illustrates an image position P23*b* detected in the divided image I23*b* by the same trajectory extraction server 8-1 as that in FIG. 13A.

In the image recognition processing of object detection in step S31, as illustrated in FIG. 13A a detection region 40 in a rectangular shape is recognized as a detection result of the object of the recognition target in the captured image 121, for example. The trajectory extractor 81 calculates, as the image position P21, coordinates of the center point in detection region 40 on the image, for example. The image position P21 is held in the internal memory of the controller 80, for example.

In the examples in FIGS. 13A and 13B, the trajectory extractor 81 of the trajectory extraction server 8-1 detects an image position P21 in the image data 21 from the camera 2-1 in charge, as shown in FIG. 13A, and detects an image position P23*b* in the image data 23*b* from the camera 2-3 not in charge on the divided image I23*b*.

Next, the trajectory extractor 81 determines whether there is image data from the camera 2 not in charge, that does is, corresponding to the own apparatus, among one or more pieces of image data whose image position is detected in step S31 (S32). The trajectory extractor 81 refers to the camera ID associated with each piece of image data, and determines whether or not the image data is from the camera 2 not in charge, for example.

When determining that there is image data from the camera 2 not in charge (YES in S32), the trajectory extractor 81 transmits information indicating the image position detected in the image data to the trajectory extraction server 8 corresponding to that camera 2, among the plurality of trajectory extraction servers 8-1 to 8-3 (S33). In the present embodiment, the plurality of trajectory extraction servers 8 mutually transmit and receive information on the image position through the respective communication interfaces 85.

For example, since the image data 23*b* of the divided image I23*b* (FIG. 13B) is the image data from the camera 2-3 not in charge (NO in S32), the trajectory extractor 81 of the trajectory extraction server 8-1 transmits the information on the image position P32 in the divided image I23*b* to the trajectory extraction server 8-3 corresponding to camera 2-3 (S33).

On the other hand, when determining that there is no image data from the camera 2 not in charge (NO in S32), the trajectory extractor 81 proceeds to step S34 without particularly performing step S33.

The trajectory extractor 81 determines whether or not the communication interface 85 of the own apparatus receives the information on the image position within a predetermined period from another trajectory extraction server 8 among the plurality of trajectory extraction servers 8-1 to 8-3, for example (S34).

When the information on the image position regarding the camera 2 in charge is received from another trajectory extraction server 8 (YES in S34), the trajectory extractor 81 updates the detection result of the image position regarding the camera 2 in charge based on the received information on the image position (S35). FIG. 13C illustrates an image position P23 in the detection result in the captured image 123 in the congestion state. For example, the trajectory extractor 81 of the trajectory extraction server 8-3 receives the information on the image position P23b of the corresponding camera 2-3 from the trajectory extraction server 8-1 (YES in S32), and adds the information to the image position P23 of the detection result (S35).

On the other hand, when the information on the image position is not received from another trajectory extraction server 8 (NO in S34), the trajectory extractor 81 proceeds to step S36 without particularly performing step S35.

Next, the trajectory extractor 81 calculates a map position indicating a position of a recognition target such as the person 11 on the map of the environment 6 by calculating coordinate conversion the image position of the detection result (S36), for example. In each of the trajectory extraction servers 8, the trajectory extractor 81 performs coordinate conversion based on, for example, parameters stored in advance in the storage 89 of the own apparatus, wherein the parameters define conversion from the image position regarding the camera 2 in charge to the map position.

The trajectory extractor 81 acquires past trajectory information within a predetermined period, such as from the present at which the map position is calculated to several frames before (S37). The trajectory extractor 81 acquires past trajectory information such as a map position and a speed from individual trajectory information stored in the storage 84 of the own apparatus, for example.

Next, the trajectory extractor 81 generates current individual trajectory information based on the calculated current map position and the acquired past trajectory information (S38). For example, the trajectory extractor 81 calculates a predicted position, that is, a map position in the current frame predicted from a map position and a speed in the past trajectory information on each trajectory, and generates individual trajectory information by linking the current map position to a trajectory whose distance between the predicted position and the calculated map position is shorter than a predetermined value. The predetermined value of the distance is a small value to the extent that can be regarded as the same point on the map. In addition, since a map position that cannot be linked is considered to indicate a position or the like of a person coming from outside the imaging range, the position is included in the individual trajectory information, for example. The generated individual trajectory information is stored in the storage 84, for example.

When the trajectory extractor 81 transmits the generated individual trajectory information to the trajectory integration server 9 through the communication interface 85 (S39), the processing shown in the present flowchart ends, for example. By the above processing in each of the trajectory extraction servers 8-1, 8-2, and 8-3, pieces of the individual trajectory information L1, L2, and L3 are respectively transmitted from the trajectory extraction servers 8-1, 8-2, and 8-3 to the trajectory integration server 9.

As described above, in each of the plurality of trajectory extraction servers 8, the trajectory extractor 81 acquires image data from the image distributor 72 of the congestion management server 7 (S30), and generates individual trajectory information based on the image data from the corresponding camera (S38). Accordingly, the processing load of image recognition is distributed in the plurality of trajectory extraction servers 8, and it is possible to suppress the extended processing time in some trajectory extraction servers.

In addition, the trajectory extractor 81 detects the image position of the moving object of the recognition target by the image recognition processing from the image data (S31), and transmits and receives the image position between the plurality of trajectory extraction servers 8 (S33, S34), thereby using the image position by the camera in charge for each trajectory extraction server 8. Accordingly, in each trajectory extraction server 8, individual trajectory information based on the image data from the camera 2 in charge can be obtained.

2-5. Trajectory Integration Processing

An operation of the trajectory integration server 9 will be described with reference to FIG. 14. The trajectory integration server 9 performs trajectory integration processing (S4 in FIG. 5) integrating individual trajectory information L1, L2, and L3 generated by each of the plurality of trajectory extraction servers 8-1 to 8-3, to generate the entire trajectory information L0 indicating all trajectories in the imaging range of the plurality of cameras 2-1 to 2-3.

Figure 14:
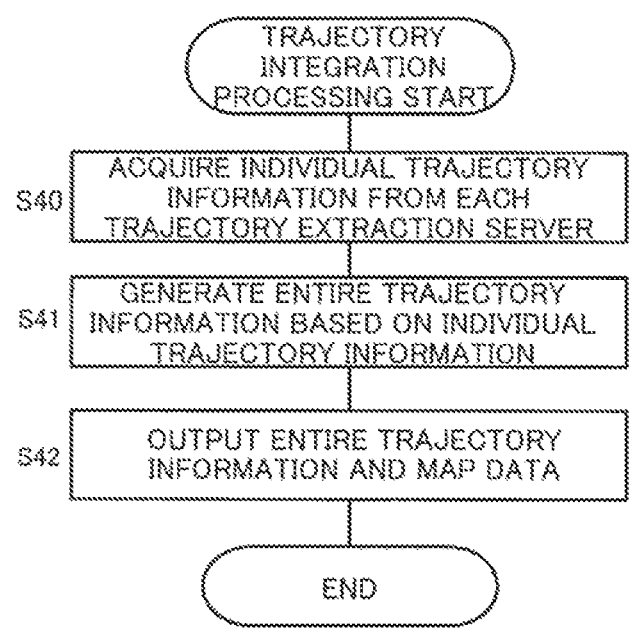
FIG. 14 is a flowchart illustrating trajectory integration processing in the trajectory integration server of the first embodiment.

FIG. 14 is a flowchart illustrating trajectory integration processing (S4) by the trajectory integration server 9. Each processing shown in the flowchart in FIG. 14 is performed by the controller 90 functioning as the trajectory integrator 91 in the trajectory integration server 9. The flowchart in FIG. 14 is started for every frame cycles of a moving image, for example.

First, the trajectory integrator 91 receives individual trajectory information L1, L2, and L3 respectively from the plurality of trajectory extraction servers 8-1 to 8-3 through the communication interface 95 (S40).

Next, the trajectory integrator 91 generates entire trajectory information L0 based on the plurality of pieces of received individual trajectory information L1 to L3 (S41). The trajectory integrator 91 compares map positions of the respective trajectories in separate pieces of individual trajectory information L1 to L3 with each other, and integrates trajectories considered to be trajectories of the same person, for example. Integration of the trajectories is performed in consideration of a distance range that can be regarded as the same on the map similarly to the predetermined value in step S38, for example.

The trajectory integrator 91 outputs, entire trajectory information L0 and map data indicating a map of the environment 6 to the display terminal 4 through the output interface 96 (S42) for example. The map data is stored in the storage 84 in advance, for example. Consequently, the trajectory integrator 91 superimposes the entire trajectory information on the map data to display on the display terminal 4.

The trajectory integrator 91 ends the processing shown in the present flowchart after the output of the entire trajectory information L0 (S42).

As described above, the trajectory integrator 91 couples individual trajectory information L1 to L3 acquired from the plurality of trajectory extraction servers 8 to generate entire trajectory information L0 (S41, S42), and outputs the entire trajectory information L0 together with map data, for example (S42). Accordingly, the trajectories based on the image data by the plurality of cameras 2 can be integrated to be displayed, and the user 3 can easily analyze the trajectories over the imaging range of each of the plurality of cameras 2.

3. Effects

As described above, the trajectory detection system 1 according to the present embodiment is an example of a moving object detection system for detecting a plurality of moving objects such as persons 11 or the like based on a captured image. The trajectory detection system 1 includes: a plurality of cameras 2 to capture images in a predetermined cycle to generate image data, a plurality of trajectory extraction servers 8 (a plurality of image recognition circuitries) to perform image recognition on the image data from each camera to detect a moving object in a captured image indicated by the image data, and a congestion management server 7 (information management apparatus) to manage image data supplied from the cameras 2 to the trajectory extraction servers 8. The congestion management server 7 includes a communication interface 75 to perform data communication with the cameras 2-1, 2-2, and 2-3 and the trajectory extraction servers 8-1, 8-2, and 8-3, and a controller 70 to control the operation of the communication interface 75. The controller 70 is operable to manage the congestion information indicating the quantity corresponding to the number of moving objects localized within a range of the captured image indicated by image data for each of the cameras 2-1, 2-2, and 2-3 as in the congestion information table T1 (S1), for example, and control the communication interface 75 to supply the image data from the plurality of cameras 2 to each of the trajectory extraction servers 8-1, 8-2, and 8-3, distributing the image data according to a magnitude of the quantity such as the congestion degree indicated by the congestion information (S2).

According to the trajectory detection system 1 described above, the image data from the plurality of cameras 2 is distributed according to the magnitude of the quantity indicated by the congestion information and is supplied to the plurality of trajectory extraction servers 8. Accordingly, the processing to detect the moving object can be efficiently performed in the plurality of trajectory extraction servers 8.

In the present embodiment, the controller 70, functioning as the image distributor 72, sets the trajectory extraction servers to a plurality of distribution destinations for the image data in which the congestion information indicates a quantity equal to or more than a predetermined amount, among the image data from the plurality of cameras 2 (S2). Accordingly, it is possible to suppress an increase in load of processing to detect a moving object by performing image recognition in some of the plurality of trajectory extraction servers 8, and to efficiently perform processing in the plurality of trajectory extraction servers 8.

In the present embodiment, the controller 70, functioning as the image distributor 72, controls the communication interface 75 to separately supply a plurality of pieces of divided data, which is obtained by dividing a captured image indicated by one piece of image data into a plurality of regions, to trajectory extraction servers of the plurality of distribution destinations (S2). Accordingly, the processing loads in each of the trajectory extraction servers 8-1, 8-2, and 8-3 can be easily distributed to the same degree.

In the present embodiment, each of trajectory extraction servers 8-1, 8-2, and 8-3 is operable to repeatedly detect a moving object to generate individual trajectory information L1, L2, and L3 as an example of trajectory information indicating trajectories of the moving object (S3). Each of the trajectory extraction servers 8-1, 8-2, and 8-3 may perform only image recognition, and may transmit a detection result of the moving object through the communication interface 85, for example. In this case, the trajectory information may be generated by the trajectory integration server 9 or an information processing apparatus outside the trajectory detection system 1 that receives the detection result, for example.

The trajectory detection system 1 of the present embodiment further includes a trajectory integration server (information integration apparatus) to generate entire trajectory information L0 (S4) as an example of information indicating a trajectory of a moving object in ah entire range imaged by the plurality of cameras 2 based on individual trajectory information L1, L2, and L3 respectively generated by the trajectory extraction servers 8-1, 8-2, and 8-3. Accordingly, the user 3 can analyze the trajectory in the entire imaging range by the plurality of cameras 2, for example.

In the present embodiment, the controller 70 is operable to calculate a motion difference as an example of the motion amount for the moving object in the captured image based on the image data of a plurality of frames sequentially captured by the respective cameras 2-1, 2-2, and 2-3, and generate congestion information based on the calculated motion difference (S1). Accordingly, using the motion difference that can be less computationally demanding makes it possible to generate the congestion information including the information based on the latest frame while suppressing the processing load of the congestion management server 7.

The congestion management server 7 of the present embodiment is an example of an information management apparatus in the trajectory detection system 1 including: a plurality of cameras 2, and a plurality of trajectory extraction servers 8 each being operable to recognize, based on image data from a corresponding one of the cameras 2-1, 2-2, and 2-3, a plurality of moving objects in a captured image indicated by the image data. The congestion management server 7 includes: a communication interface 75 to perform data communication with the cameras 2-1, 2-2, and 2-3 and the trajectory extraction servers 8-1, 8-2, and 8-3, and a controller 70 to control the operation of the communication interface 75 to manage the image data supplied from the cameras 2-1, 2-2, and 2-3 to the trajectory extraction servers 8-1, 8-2, and 8-3. The controller 70 is operable to manage the congestion information indicating a quantity corresponding to the number of moving objects are localized within the range of the captured image indicated by image data for each of the cameras 2-1, 2-2, and 2-3 (S1), and control the communication interface 75 to supply the image data to each of the trajectory extraction servers 8-1, 8-2, and 8-3, distributing the image data from the plurality of cameras 2 according to a magnitude of the quantity indicated by the congestion information (S2).

According to the congestion management server 7 described above, in the trajectory detection system 1, the plurality of trajectory extraction servers 8 can efficiently perform processing to recognize the moving object can be.

Second Embodiment

Hereinafter, the second embodiment of the present disclosure will be described with reference to FIGS. 15A and 15B. In the second embodiment, an operation of the congestion management server 7 that manages distribution of congestion information and image data using a positional relationship among a plurality of cameras 2 will be described.

Hereinafter, description of configurations and operations similar to those of the trajectory detection system 1 and the congestion management server 7 according to the first embodiment will be omitted as appropriate, and the trajectory detection system 1 and the congestion management server 7 according to the present embodiment will be described.

Figure 15A:
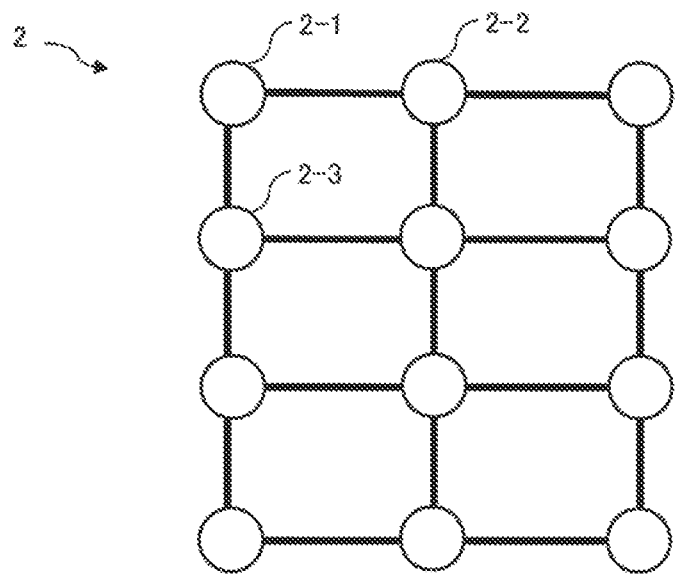
FIGS. 15A and 15B are diagrams for illustrating propagation of a congestion state among a plurality of cameras in a second embodiment.
Figure 15B:
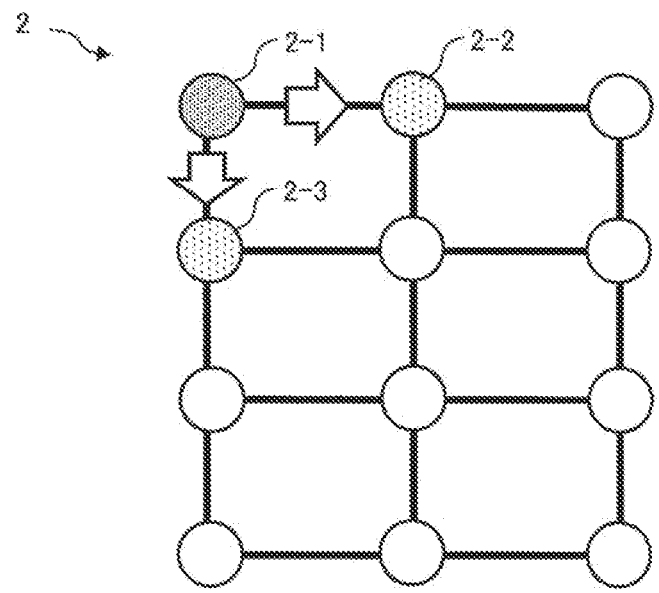

FIGS. 15A and 15B are diagrams for illustrating propagation of a congestion state among a plurality of cameras in the present embodiment. FIG. 15A illustrates the adjacency information for the plurality of cameras 2. The adjacency information is an example of arrangement information indicating a positional relationship between the cameras in a state where the plurality of cameras 2 are arranged in the environment 6.

In FIG. 15A, the relationship between adjacent cameras in the plurality of cameras 2 is illustrated by a solid line. For example, in the illustration in FIG. 15A, the camera 2-1 is adjacent to the cameras 2-2 and 2-3. The adjacency information is stored in advance in the storage 74 of the congestion management server 7, for example. FIG. 15B is a diagram illustrating congestion determination processing of the present embodiment based on the adjacency information in FIG. 15A.

In the present embodiment, the congestion determiner 71 of the congestion management server 7 first generates, regarding one camera in the plurality of cameras 2, congestion information based on image data from that camera as in the first embodiment, for example. The congestion information of the present embodiment does not particularly include the motion difference data, and only needs to be information in which the camera ID and the congestion flag are associated with each other. FIG. 15B shows an example of a case where the congestion information for the camera 2-1 is generated and the congestion flag in the congestion information is "ON".

Next, based on the adjacency information of the plurality of cameras 2, the congestion determiner 71 updates the congestion information on the camera adjacent to the camera whose congestion flag in the congestion information is "ON". It is considered that the camera adjacent to the camera with congestion flag being "ON" is likely to be in a congestion state in the future. Thus, the congestion determiner 71 of the present embodiment generates congestion information indicating that the adjacent camera is "expected to be congested" by a flag or the like different from the congestion flag. In the example in FIG. 15B, the cameras 2-2 and 2-3 adjacent to the camera 2-1 are set to "expected to be congested".

For a camera being "expected to be congested", the congestion determiner 71 changes the congestion flag to "ON" a predetermined number of frames after the current frame and sets the camera as a processing target of the image distributor 72, for example. The predetermined number of frames indicates a period in which congestion in an imaging range of an adjacent camera is presumed to propagate. The number of frames may be set depending on a moving object of a recognition target in the trajectory extraction processing in the plurality of trajectory extraction servers 8.

Based on the congestion information in the plurality of cameras 2, the congestion determiner 71 updates the congestion flag of each camera at each time of congestion determination processing performed in a frame cycle of the plurality of cameras 2. For a camera whose congestion flag is "ON", the congestion flag may be updated to "OFF" when the camera is not adjacent to another camera whose congestion flag is "ON" a predetermined number of frames after the current frame, for example.

According to the above processing, based on the adjacent information for each camera in the plurality of cameras 2, the congestion flag in the congestion information is updated, and it is possible to performs the congestion determination processing reflecting the propagation of the congestion state by the moving object such as the persons 11. Accordingly, in the image distribution processing, the images by the cameras adjacent to the camera whose congestion flag is "ON" in the plurality of cameras 2 can be divided in advance and distributed to the plurality of trajectory extraction servers 8, and the trajectory extraction processing can be easily performed in real-time.

As described above, the controller 70 of the congestion management server 7 according to the present embodiment, functioning as the congestion determiner 71, is operable to update the congestion information based on the adjacency information as an example of the information regarding the arrangement of the plurality of cameras 2 (see FIGS. 15A and 15B). Accordingly the division of the image can be started before the moving object actually moves to the imaging range of each camera, for example.

Third Embodiment

Figure 16:
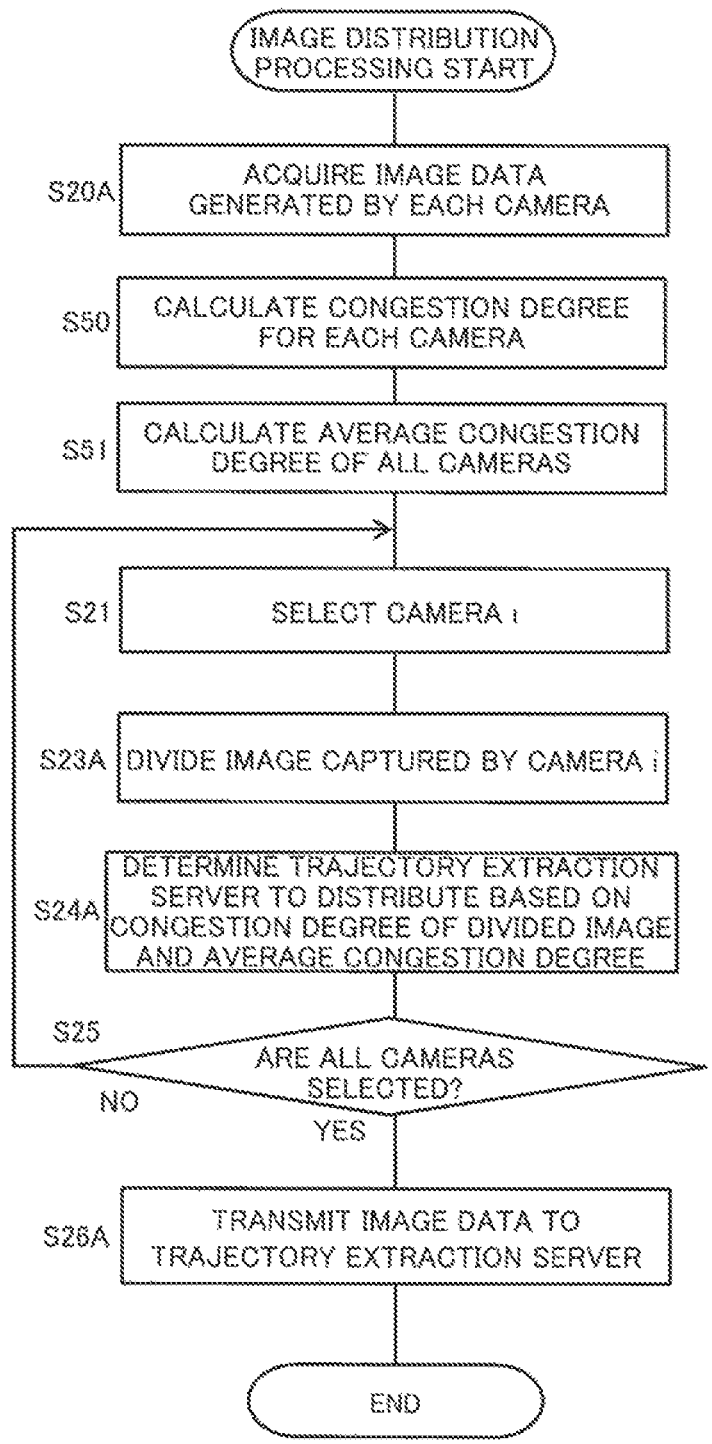
FIG. 16 is a flowchart illustrating image distribution processing of a third embodiment.

Hereinafter, a third embodiment of the present disclosure will be described with reference to FIG. 16. In the first embodiment, an example is described in which the image distributor 72 operates based on the congestion flag according to the determination result by the congestion determiner 71 in the congestion management server 7. In the third embodiment, the congestion management server 7 will be described in which the image distributor 72 first divides the images captured by all the cameras in the plurality of cameras 2 without using the congestion flag in particular, and distributes the images according to the congestion information.

The operation of the image distributor 72 in the congestion management server 7 of the present embodiment will be described with reference to FIG. 16. FIG. 16 is a flowchart illustrating image distribution processing by the image distributor 72 of the third embodiment. Hereinafter, description of processing similar to the image distribution processing of the first embodiment (FIG. 10) will be appropriately omitted.

First, the controller 70 as the image distributor 72 in the congestion management server 7 of the present embodiment acquires image data generated by the plurality of cameras 2 (S20A).

The controller 70 calculates the congestion degree in each captured image based on the acquired image data generated by a corresponding one of cameras (S50). The controller 70 calculates the congestion degree similarly to the congestion determination processing of the first embodiment (FIG. 7), for example. The controller 70 calculates an average congestion degree indicating an congestion degree average for all the cameras averaging the congestion degrees of the respective cameras (S51).

The controller 70 selects one camera i from the plurality of cameras 2 (S21), and divides the image indicated by the image data from the camera i into a predetermined number of divisions (S23A). The predetermined number of divisions is set similarly to step S23 in FIG. 10, for example. The controller 70 calculates the congestion degree for each divided image similarly to step S50, associates the congestion degree with the image data on each divided image, and holds the congestion degree in an internal memory, for example. The predetermined number of divisions may be set as appropriate according to the average congestion degree calculated in step S51 so that the congestion degree in the image data after division is smaller than the average congestion degree.

Next, the controller 70 determines distribution destinations of the divided images among the plurality of trajectory extraction servers 8 based on the congestion degree of the divided image captured by the camera i and the average congestion degree (S24A). Specifically, regarding each of the plurality of trajectory extraction servers 8, the controller 70 determines the distribution destination so that the total value of the congestion degrees of the divided images to be distributed is about the same as the average congestion degrees. The controller 70 performs distribution so that the total value of the congestion degrees of the divided images is smaller than the average congestion degree, for example.

The controller 70 repeats steps S21 to S24A until all the cameras in the plurality of cameras 2 are selected (NO in S25). When all the cameras are selected (YES in S25), the controller 70 transmits the image data indicating the divided images captured by the respective cameras in the plurality of cameras 2, from the plurality of trajectory extraction servers 8 to the trajectory extraction server determined as the distribution destination in step S24A (S26A).

The image distributor 72 transmits the image data to the plurality of trajectory extraction servers 8 (S26A), then ends the processing shown in the present flowchart.

According to the above processing, the image distributor 72 of the present embodiment calculates the average congestion degree in the plurality of cameras 2 (S51), divides the images for all the cameras (S23A), and distributes the images to the plurality of trajectory extraction servers 8 based on congestion information such as the congestion degrees of the divided images and the average congestion degree (S24A). Accordingly, the images by the plurality of cameras 2 can be distributed so that the load in the trajectory extraction processing in each of the plurality of trajectory extraction servers 8 becomes close to equal, and the trajectory extraction processing can be easily performed in real time.

In addition, in step S50 of the present embodiment, the congestion degree is calculated in the image data indicating the current frame acquired from the congestion determiner 71, but the present invention is not limited thereto. For example, the congestion degree in the image data of the past frame may be calculated, and in step S23A, the image of the current frame may be divided based on the congestion degree in the past frame.

As described above, the controller 70 of the congestion management server 7 according to the present embodiment, functioning as the image distributor 72, is operable to calculate a congestion degree in respective pieces of image data from the plurality of cameras 2, the congestion degree indicating the congestion information in each region into which the image indicated by each piece of image data is divided (S23A). The controller 70 distributes the respective pieces of image data from the plurality of cameras 2 to the plurality of trajectory extraction servers 8 to transmit the respective pieces image data, based on the calculated congestion degree (S24A, S26A). In the present embodiment, the controller 70 may divide and distribute the image of the current frame based on the congestion degree calculated from the image data of the past frame of the moving image captured by the plurality of cameras 2.

Fourth Embodiment

Hereinafter, a fourth embodiment of the present disclosure will be described with reference to FIG. 17. In the first embodiment, an operation example in which the congestion degree based on the motion difference in the image data and the congestion information are used in the congestion management server 7 is described. In the fourth embodiment, an operation example of the congestion management server 7 using congestion information based on detection results of a plurality of trajectory extraction servers 8 will be described.

Figure 17:
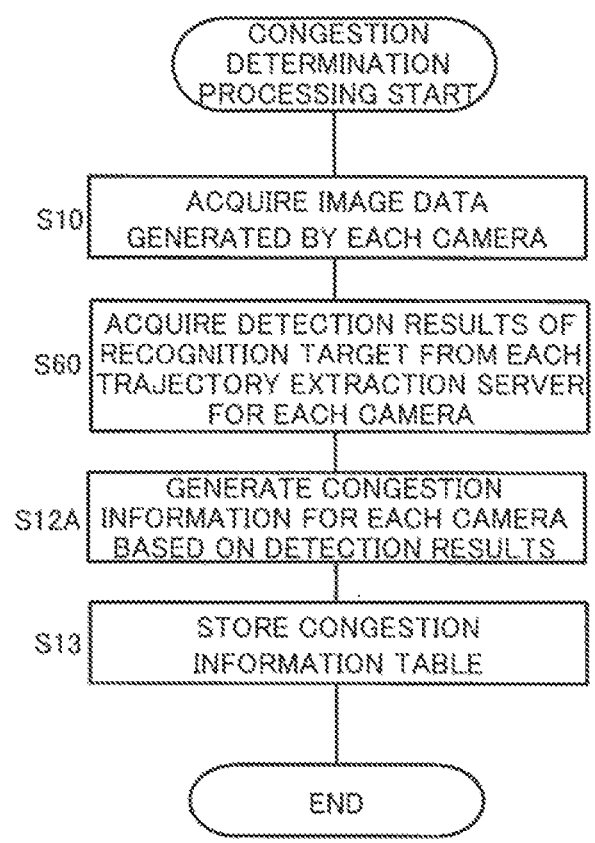
FIG. 17 is a flowchart illustrating congestion determination processing of a fourth embodiment.

FIG. 17 is a flowchart illustrating congestion determination processing in the fourth embodiment. Hereinafter, processing similar to the congestion determination processing of the first embodiment will be appropriately omitted and described (FIG. 7).

The congestion determiner 71 of the present embodiment acquires the detection results of the recognition target in the respective pieces of image data generated by the plurality of cameras 2 from the plurality of trajectory extraction servers 8 through the communication interface 75, for example (S60). Specifically, the congestion determiner 71 acquires the number of recognition targets detected in the image data of the past frame for each camera of the plurality of cameras 2. For example, the past frame is a frame transmitted to the plurality of trajectory extraction servers 8 earlier than a current frame for frame cycles in which the congestion determination processing is performed.

The congestion determiner 71 generates congestion information for the plurality of cameras 2 based on the number of recognition targets acquired as a detection result (S12A). For example, the congestion determiner 71 of the present embodiment generates congestion information in which the camera ID of each camera, the congestion flag determining congestion or non-congestion state depending on whether the number of recognition targets is a predetermined number or more, and the number of recognition targets are associated with each other. The predetermined number is a sufficiently small number from the same viewpoint as the predetermined threshold value in step S12 of the first embodiment.

According to the above processing, the congestion determiner 71 of the present embodiment generates congestion information based on the number of recognition targets in the image data of the past frame for each of the plurality of cameras 2. Accordingly, the image distributor 72 performs image distribution processing on the image data of the current frame based on the congestion information.

As described above, the controller 70 of the congestion management server 7 according to the present embodiment, functioning as the congestion determiner 71, acquires the number of moving objects such as the persons 11 detected by each of the plurality of trajectory extraction servers 8 (S60), and generate congestion information, based on the acquired number of moving objects (S12A). Accordingly, using the detection result by each trajectory extraction server reduces the processing performed by the congestion management server 7 and allows the congestion determination processing to be efficiently performed.

Other Embodiments

As described above, the first to fourth embodiments are described as exemplification of the technique disclosed in the present application. However, the technique in the present disclosure is not limited thereto, and can also be applied to embodiments in which changes, substitutions, additions, omissions, and the like are made as appropriate. In addition, it is also possible to combine each component described in each of the above-described embodiments to form a new embodiment. Thus, in the following, other embodiments will be exemplified.

In the above embodiments, the trajectory extractor 81 acquires image data from the congestion management server 7 (S30). The trajectory extractor 81 of the present embodiment may acquire congestion information in addition to image data. Furthermore, in the present embodiment, the trajectory extraction server 8 may be configured to be communicable with the camera 2 through the communication interface 85, for example. Accordingly, the trajectory extractor 81 may directly acquire image data other than the divided image from the camera 2 without through the congestion management server 7 according to the acquired congestion information, for example.

In the first embodiment, in the image distribution processing (S2), each trajectory extraction server 8 corresponding to each camera 2 is set in advance as a supply destination of the image data from the camera 2 (S24). In the image distribution processing of the present embodiment, the image data from the plurality of cameras 2 may be supplied to one trajectory extraction server 8. For example, the image distributor 72 of the present embodiment may transmit the both image data 21 and 22 from the cameras 2-1 and 2-2 determined to be in the non-congestion state to the trajectory extraction server 8-1. In this case, the image distributor 72 may distribute the image data 23 from the camera 2-3 determined to be in the congestion state to the trajectory extraction servers 8-2 and 8-3 dividing the captured image 123.

According to the above image distribution processing, even when the congestion degree in the captured image 123 is particularly higher than the congestion degrees in the captured images 121 and 122, the processing load can be easily distributed among the plurality of trajectory extraction servers 8-1 to 8-3, for example.

In the first embodiment, in the trajectory detection system 1, the trajectory extraction servers 8-1, 8-2, and 8-3 are respectively provided correspondingly to the cameras 2-1, 2-2, and 2-3. In the trajectory detection system 1 of the present embodiment, the number of the plurality of cameras 2 and the number of the plurality of trajectory extraction servers 8 do not need to be the same. For example, the larger number of trajectory extraction servers 8 than the number of the plurality of cameras 2 may be provided.

In the first embodiment, the congestion determiner 71 generates congestion information using a motion difference based on image data (S11, S12). The congestion determiner 71 of the present embodiment may acquire the entire trajectory information L0 stored in the storage 94 of the trajectory integration server 9 instead of the motion difference and use the past trajectory information in the entire trajectory information L0. Accordingly, the congestion determiner 71 may generate a congestion flag of congestion or non-congestion as congestion information for each camera in the plurality of cameras 2, based on the position and speed of the recognition target in the past trajectory information and the imaging range of each camera, for example.

In the first embodiment, the image distributor 72 divides (S22, S23) and distributes (S24) the image data based on the congestion flag of the congestion information based on the motion difference. The image distributor 72 of the present embodiment may acquire the entire trajectory information L0 stored in the storage 94 of the trajectory integration server 9 instead of the congestion flag and use the past trajectory information in the entire trajectory information L0. Regarding the image by each camera of the plurality of cameras 2, the image distributor 72 may divide the image based on the positions of the recognition targets such as the persons 11 in the past trajectory information so that the number of persons in each divided image is substantially the same, and determine the distribution destinations so that the total number of persons in the divided image in each distribution destination is substantially the same, for example.

In the second embodiment, the congestion flag of each camera is set based on the adjacency information of the plurality of cameras 2. The congestion management server 7 of the present embodiment is not particularly limited to the above, and may update the congestion information using various types of information for predicting congestion to distribute image data. For example, the congestion determiner 71 of the present embodiment may set the congestion flag based on prior information in the imaging range of each of the plurality of cameras 2 instead of the adjacency information. As the prior information various types of knowledge of the environment 6 to which the present system 1 is applied, such as information indicating a schedule of performing specific sales in different time periods in the environment 6 such as a store sales floor can be used, for example.

For example, when the congestion flag is "ON" in the imaging range of a specific camera in the plurality of cameras 2, the prior information as described above is defined so as to indicate that the congestion flag of the imaging range of another camera is "ON" after a predetermined time. In addition, the prior information may be defined so as to indicate that the congestion flag is "ON" in a specific time period in the imaging range of a specific camera. Accordingly, even cameras not adjacent to each other can be used for image division and distribution by the image distributor 72 by setting congestion flags. The prior information as described above is an example of information regarding the tendency for movement of the moving object such as the person 11.

In addition, in the present embodiment, the congestion state in the present system 1 may be managed by applying a learned model performing congestion prediction by machine learning based on prior information such as past trajectory information. In such a machine learning, additional information may be used indicating various events or the like related to the time, the day of the week, the season, the weather, and the environment 6 at a time when the present system 1 is used, for example.

In the above embodiments, the trajectory detection system 1 is described as an example of the moving object detection system. In the present embodiment, the moving object detection system is not particularly limited to the trajectory detection system 1, and may be applied to a monitoring system monitoring movement of a moving object such as a person, or a tracking system tracking the movement, using a plurality of cameras, for example. In addition, in the present embodiment, the detection target of the moving object detection system is not particularly limited to a person, and may be various moving objects. For example, the moving object as the detection target may be a cart in the environment 6 such as a store, an automatic carrying machine in the environment 6 such as a factory, or various vehicles.

In the above embodiments, the trajectory extraction server 8 is described as an example of the image recognition circuitry. In the present embodiment, the image recognition circuitry is not particularly limited to the trajectory extraction server 8, and may be configured as a GPU or a TPU, for example. In addition, when a learned model by deep learning is applied to the processing of image recognition, the image recognition circuitry may be configured as dedicated hardware specialized in the processing of deep learning.

In the above embodiments, the congestion management server 7 is described as an example of the information management apparatus. In the present embodiment, the information management apparatus may be a PC, for example. In addition, similarly, the information integration apparatus and the image recognition circuitry may be each a PC, for example.

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiments are for exemplifying the technique in the present disclosure, various changes, substitutions, additions, omissions, and the like can be made within the scope of the claims or the equivalent thereof.

The present disclosure is applicable to various moving object detection systems that process information based on a plurality of cameras in real time, and is applicable to a trajectory detection system, a monitoring system, and a tracking system, for example.

The invention claimed is:

1. A moving object detection system for detecting a plurality of moving objects based on a captured image, the moving object detection system comprising:
    a plurality of cameras to capture images to generate image data;
    a plurality of image recognition circuitries each provided corresponding to the respective cameras, and each being operable to perform image recognition on image data generated by a corresponding one of the cameras to detect a moving object in a captured image indicated by the image data; and
    an information management apparatus to manage image data supplied from the cameras to the image recognition circuitries,
    wherein the information management apparatus includes:
    a communication interface to perform data communication with the cameras and the image recognition circuitries, and
    a controller to control an operation of the communication interface,
    wherein the plurality of cameras includes a first camera,
    the plurality of image recognition circuitries include a first image recognition circuitry corresponding to the first camera and a second image recognition circuitry not corresponding to the first camera, and
    the controller is operable to
        manage congestion information indicating a quantity corresponding to the number of moving objects localized within a range of a captured image indicated by image data for each of the cameras,
        supply first image data generated by the first camera to the first image recognition circuitry when a magnitude of a quantity indicated by the congestion information is less than a predetermined quantity in the first image data, and
        control the communication interface to supply the first image data to at least the first image recognition circuitry and the second image recognition circuitry, distributing the first image data, when the magnitude of the quantity indicated by the congestion information is the predetermined quantity or more in the first image data.

2. The moving object detection system according to claim 1, wherein
    each of the image recognition circuitries is operable to repeatedly detect the moving object to generate trajectory information indicating a trajectory of the moving object.

3. The moving object detection system according to claim 2, further comprising an information integration apparatus to generate information indicating the trajectory of the moving object in an entire range imaged by the plurality of camera, based on the trajectory information generated by each of the image recognition circuitries.

4. The moving object detection system according to claim 1, wherein
    the controller is operable to
    calculate a motion amount for a moving object in the captured image based on image data of a plurality of frames sequentially captured by each of the cameras, and
    generate the congestion information based on the calculated motion amount.

5. The moving object detection system according to claim 1, wherein
    the controller is operable to
    acquire the number of individuals of moving objects detected by each of the image recognition circuitries, and
    generate the congestion information, based on the acquired number of individuals of moving objects.

6. The moving object detection system according to claim 1, wherein
    the controller is operable to determine in advance that first image data generated by the first camera is to be distributed and to update the congestion information, before the quantity indicated by the congestion information in the first image data becomes the predetermined quantity or more, based on at least one of (i) the congestion information regarding an camera adjacent to the first camera in the plurality of cameras and (ii) information indicating a tendency that the congestion information changes due to movement of the moving object in an environment in which the plurality of camera is arranged.

7. The moving object detection system according to claim 1, wherein
    the controller is operable to
    calculate a congestion degree in respective pieces of image data generated by the plurality of cameras, the congestion degree indicating congestion information in each region into which an image indicated by each piece of image data is divided, and distribute the respective pieces of image data generated by the plurality of cameras to the plurality of image recognition circuitries to transmit the respective pieces of image data, based on the calculated congestion degree.

8. The moving object detection system according to claim 1, wherein
the plurality of cameras include a second camera corresponding to the second image recognition circuitry, and
a magnitude of a quantity indicated by the congestion information in second image data generated by the second camera is less than the predetermined quantity.

9. The moving object detection system according to claim 8, wherein
the controller is operable to
supply the second image data to the second image recognition circuitry, and
control the communication interface to separately supply a plurality of pieces of divided data to the first and second image recognition circuitries as distribution destinations when the magnitude of the quantity indicated by the congestion information is the predetermined quantity or more in the first image data, the plurality of pieces of divided data being obtained by dividing a captured image indicated by the first image data into a plurality of regions.

10. An information management apparatus in a moving object detection system,
the moving object detection system including:
a plurality of cameras, and
a plurality of image recognition circuitries each provided corresponding to the respective cameras to recognize, based on image data generated by a corresponding one of the cameras, a moving object in a captured image indicated by the image data,
the information management apparatus comprising:
a communication interface to perform data communication with the cameras and the image recognition circuitries; and
a controller to control an operation of the communication interface to manage image data supplied from the cameras to the image recognition circuitries,
wherein the plurality of cameras include a first camera,
the plurality of image recognition circuitries includes a first image recognition circuitry corresponding to the first camera and a second image recognition circuitry not corresponding to the first camera, and
the controller is operable to
manage congestion information indicating a quantity corresponding to the number of moving objects in a captured image indicated by each piece of image data for each of the cameras,
supply first image data generated by the first camera to the first image recognition circuitry when a magnitude of a quantity indicated by the congestion information is less than a predetermined quantity in the first image data, and
control the communication interface to supply the first image data to at least the first image recognition circuitry and the second image recognition circuitry, distributing the first image data, when the magnitude of the quantity indicated by the congestion information is the predetermined quantity or more in the first image data.

* * * * *

UNITED STATES PATENT AND TRADEMARK OFFICE
CERTIFICATE OF CORRECTION

| | | |
|---|---|---|
| PATENT NO. | : 12,347,203 B2 | Page 1 of 1 |
| APPLICATION NO. | : 17/945388 | |
| DATED | : July 1, 2025 | |
| INVENTOR(S) | : Miyata et al. | |

It is certified that error appears in the above-identified patent and that said Letters Patent is hereby corrected as shown below:

On the Title Page

Item (56), In the Reference Cited U.S. PATENT DOCUMENTS section, the following reference is added: --US 20190340767 A1* 11/2019 Koh et al.---------G06F18/256--

Signed and Sealed this
Twenty-sixth Day of August, 2025

Coke Morgan Stewart
*Acting Director of the United States Patent and Trademark Office*